(12) United States Patent
Suzuki

(10) Patent No.: US 11,261,039 B2
(45) Date of Patent: Mar. 1, 2022

(54) ARTICLE TRANSFER DEVICE

(71) Applicant: ISHIDA CO., LTD., Kyoto (JP)

(72) Inventor: Akihito Suzuki, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 17/014,888

(22) Filed: Sep. 8, 2020

(65) Prior Publication Data

US 2021/0094768 A1 Apr. 1, 2021

(30) Foreign Application Priority Data

Sep. 30, 2019 (JP) .............................. JP2019-179382

(51) Int. Cl.
*B65G 47/96* (2006.01)
*B65G 47/82* (2006.01)

(52) U.S. Cl.
CPC ........... *B65G 47/967* (2013.01); *B65G 47/82* (2013.01)

(58) Field of Classification Search
CPC .............................. B65G 47/967; B65G 47/82
USPC ..... 198/370.05; 414/788; 269/13–16, 37, 55
See application file for complete search history.

(56) References Cited

U.S. PATENT DOCUMENTS

| 3,653,178 A | 4/1972 | Bauer |
| 4,864,801 A | 9/1989 | Fallas |
| 7,856,797 B2 * | 12/2010 | Black ...................... B65B 35/52 53/447 |
| 9,446,917 B2 * | 9/2016 | Oppici ................. B65G 57/005 |
| 2019/0152634 A1 | 5/2019 | Almogy et al. |

FOREIGN PATENT DOCUMENTS

| DE | 2103410 A1 * | 8/1971 | ........... B65G 47/967 |
| DE | 4022120 A1 * | 1/1992 | ............. B65B 5/061 |
| GB | 2245879 A * | 1/1992 | ............. B65B 5/061 |
| JP | 2011251702 A | 12/2011 | |
| WO | WO-0170574 A1 * | 9/2001 | ............. B65B 5/108 |

OTHER PUBLICATIONS

The extended European search report dated Feb. 19, 2021.

* cited by examiner

*Primary Examiner* — Gene O Crawford
*Assistant Examiner* — Lester Ill Rushin
(74) *Attorney, Agent, or Firm* — Global IP Counselors, LLP

(57) ABSTRACT

An article transfer device is configured to transfer a plurality of articles from a placement component to a container. The placement component includes a placement surface on which the plural articles are placed. The article transfer device includes a placement component drive unit that relatively moves the container and the placement component and a control unit that controls the operation of the placement component drive unit. The control unit controls the operation of the placement component drive unit so that, when the articles on the placement component are above the container, the placement component is pulled out from between the container and the articles.

11 Claims, 22 Drawing Sheets

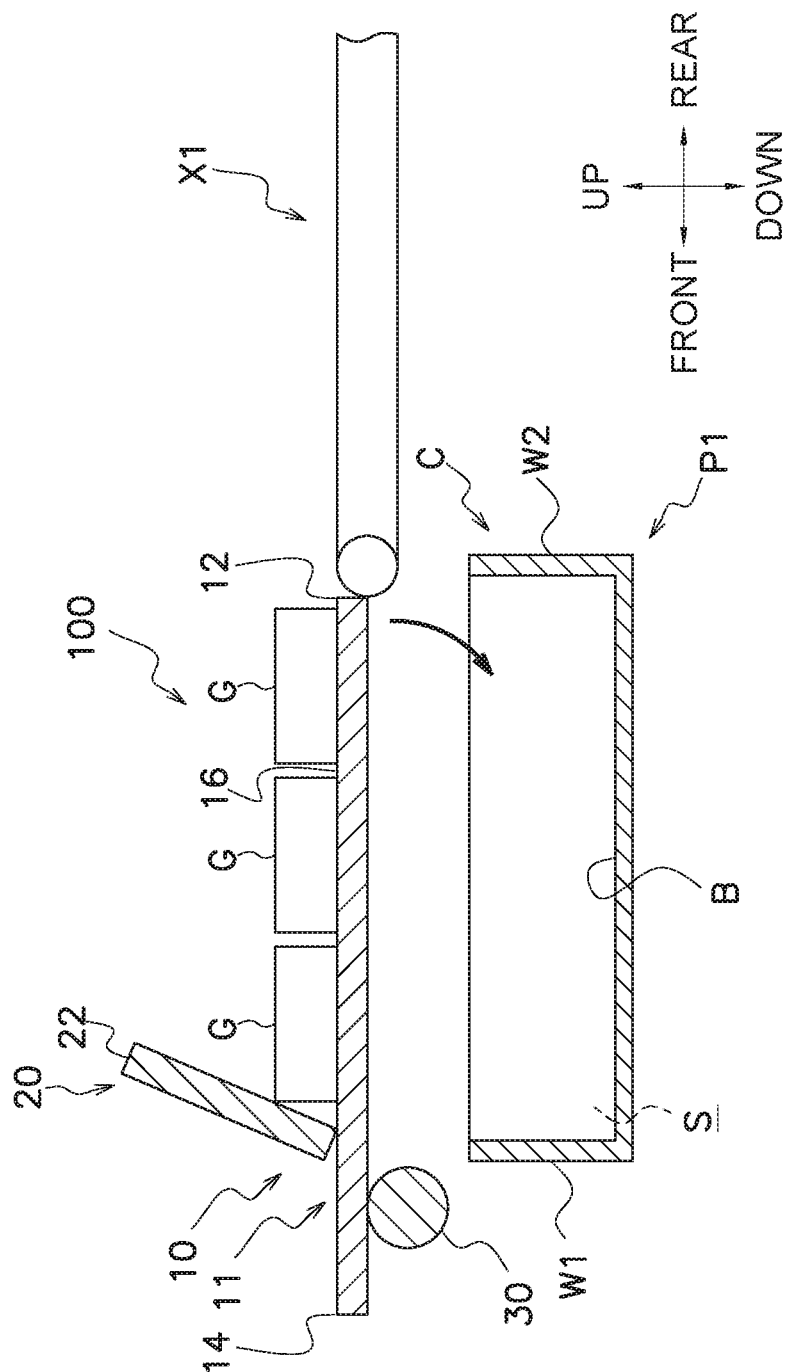

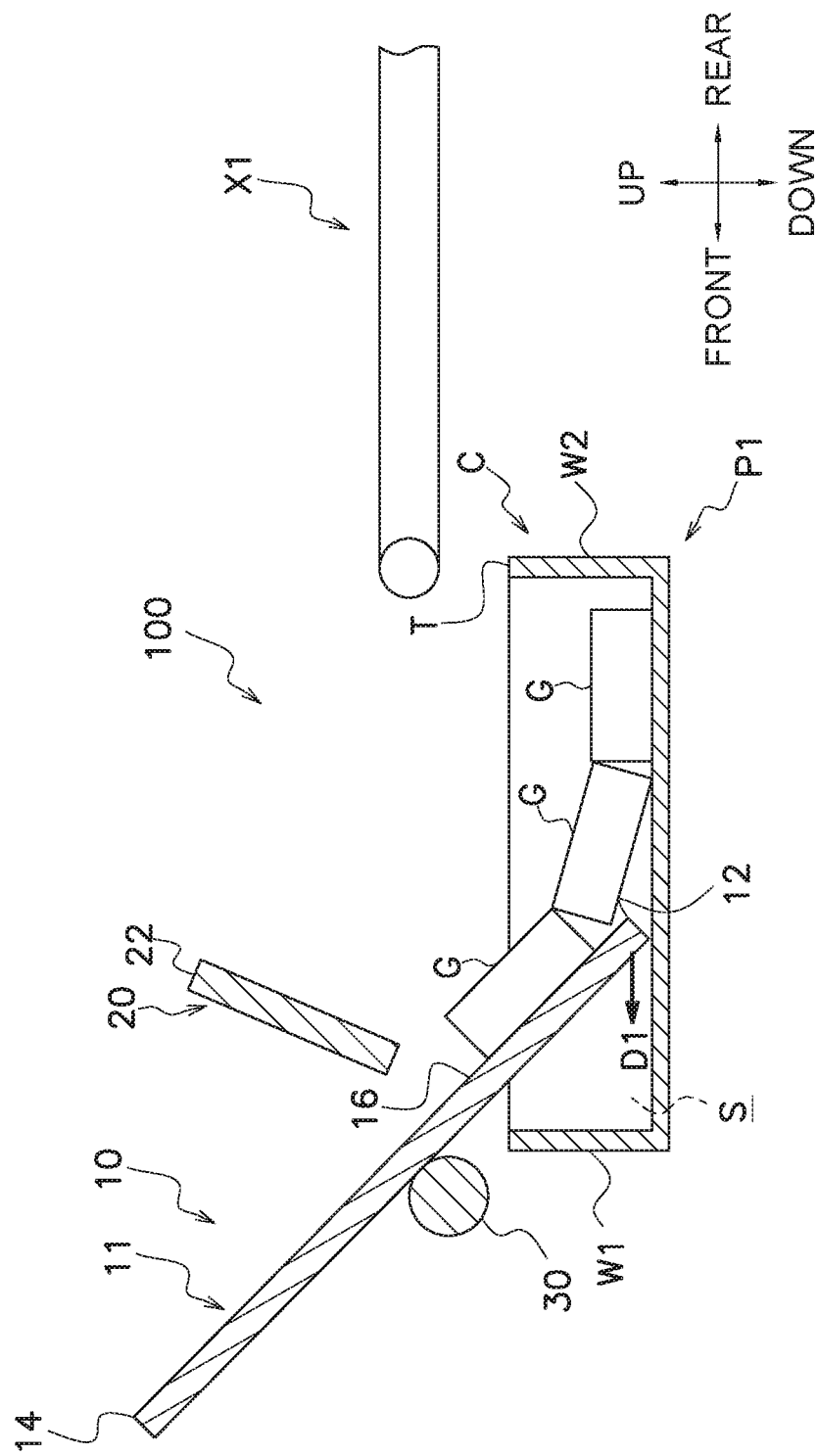
F I G. 4D

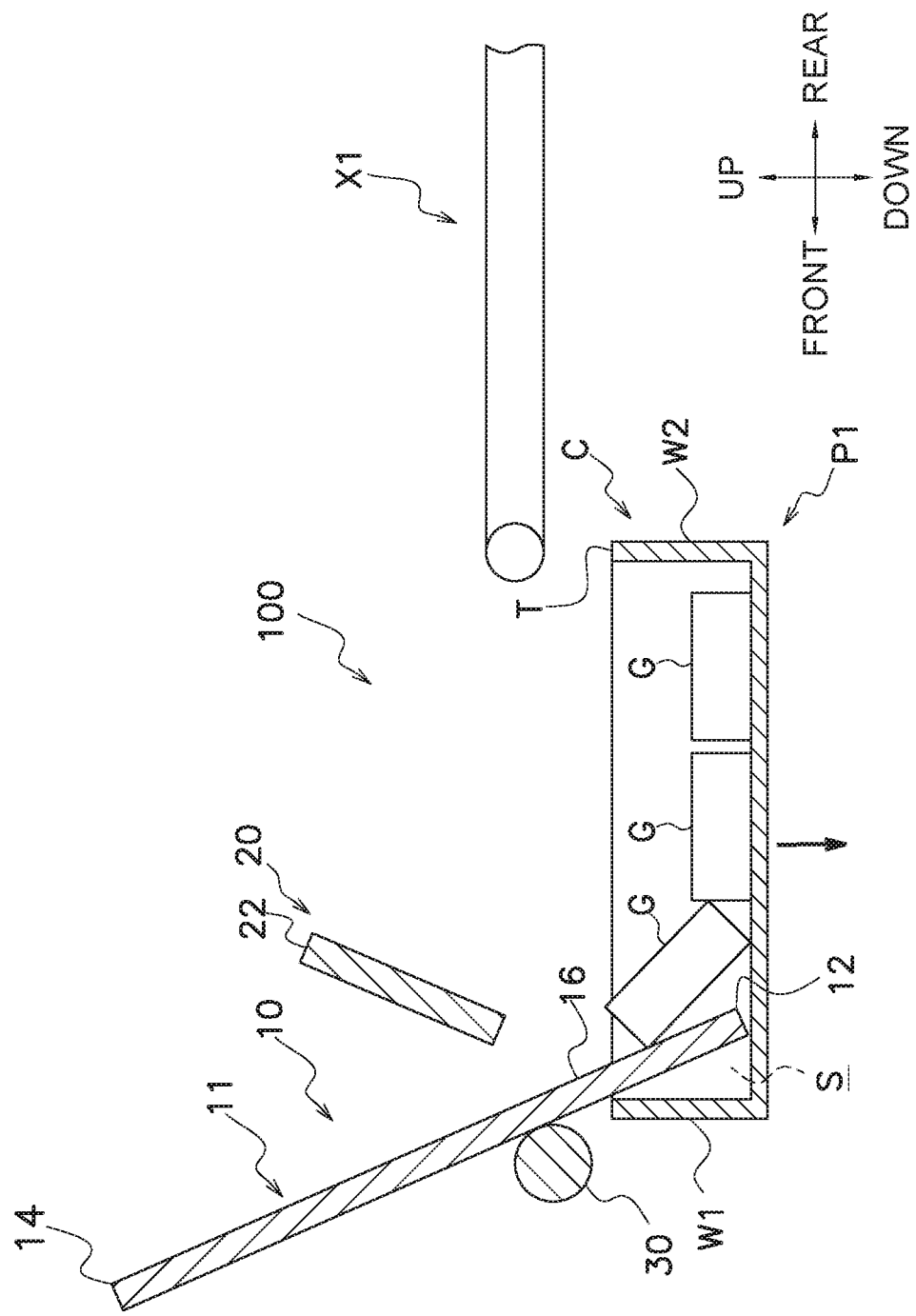
F I G. 4E

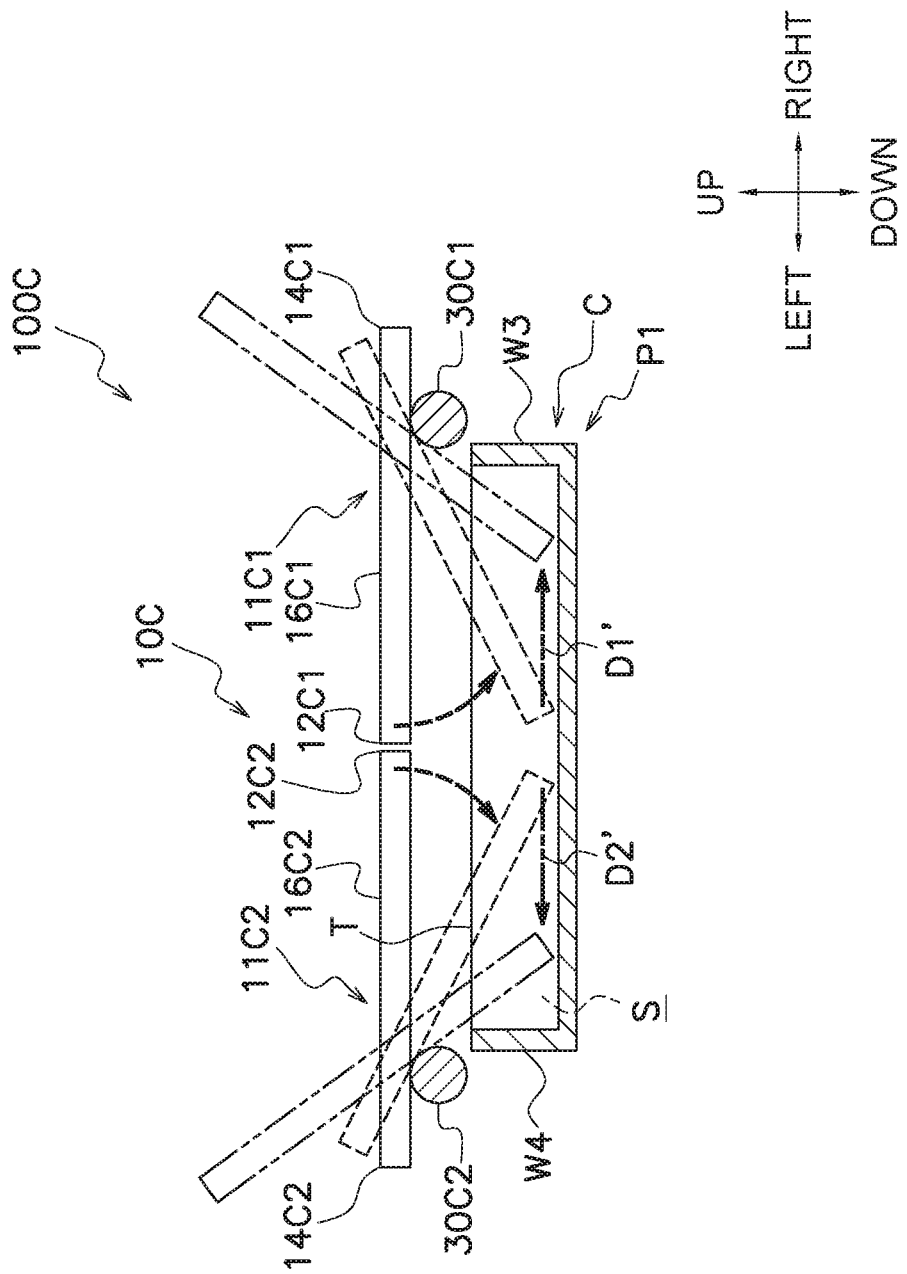
F I G. 8

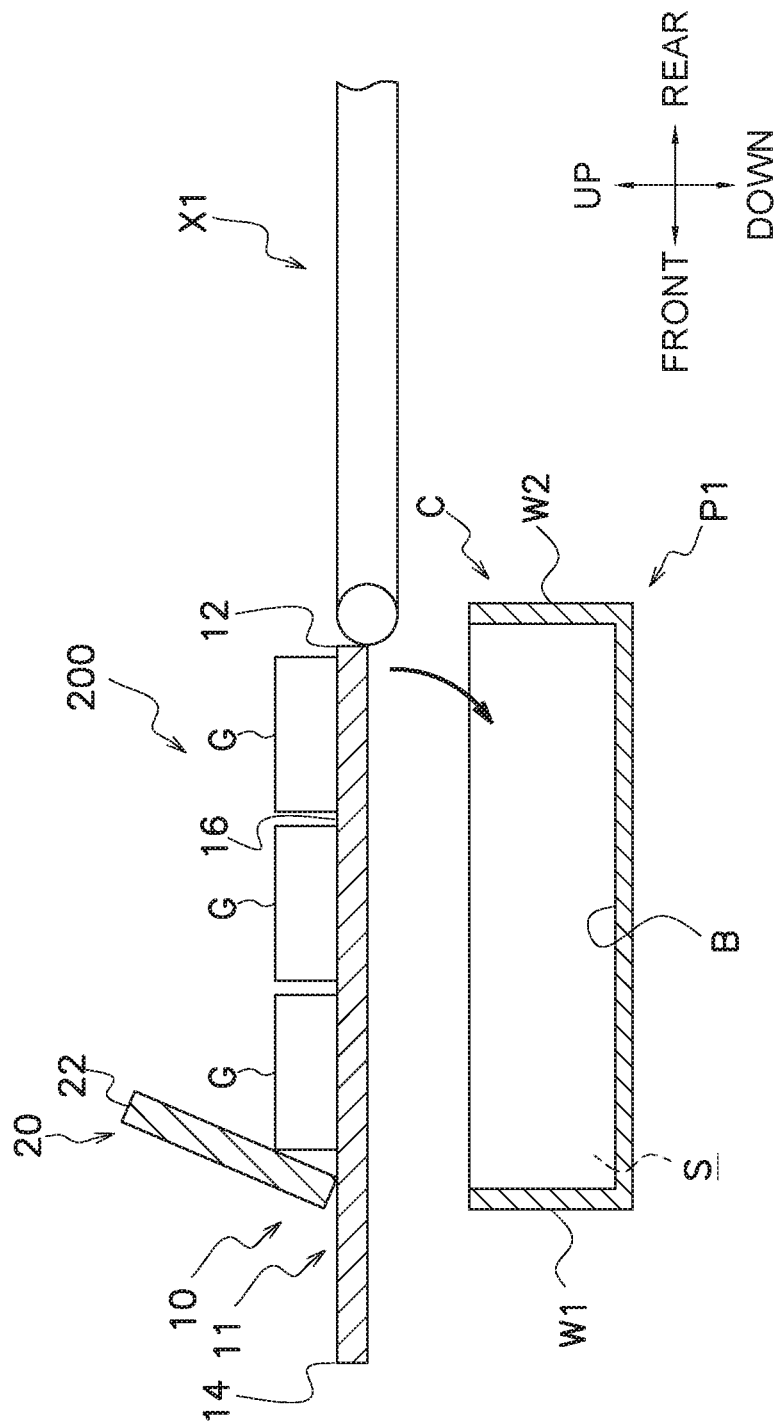
F I G. 10

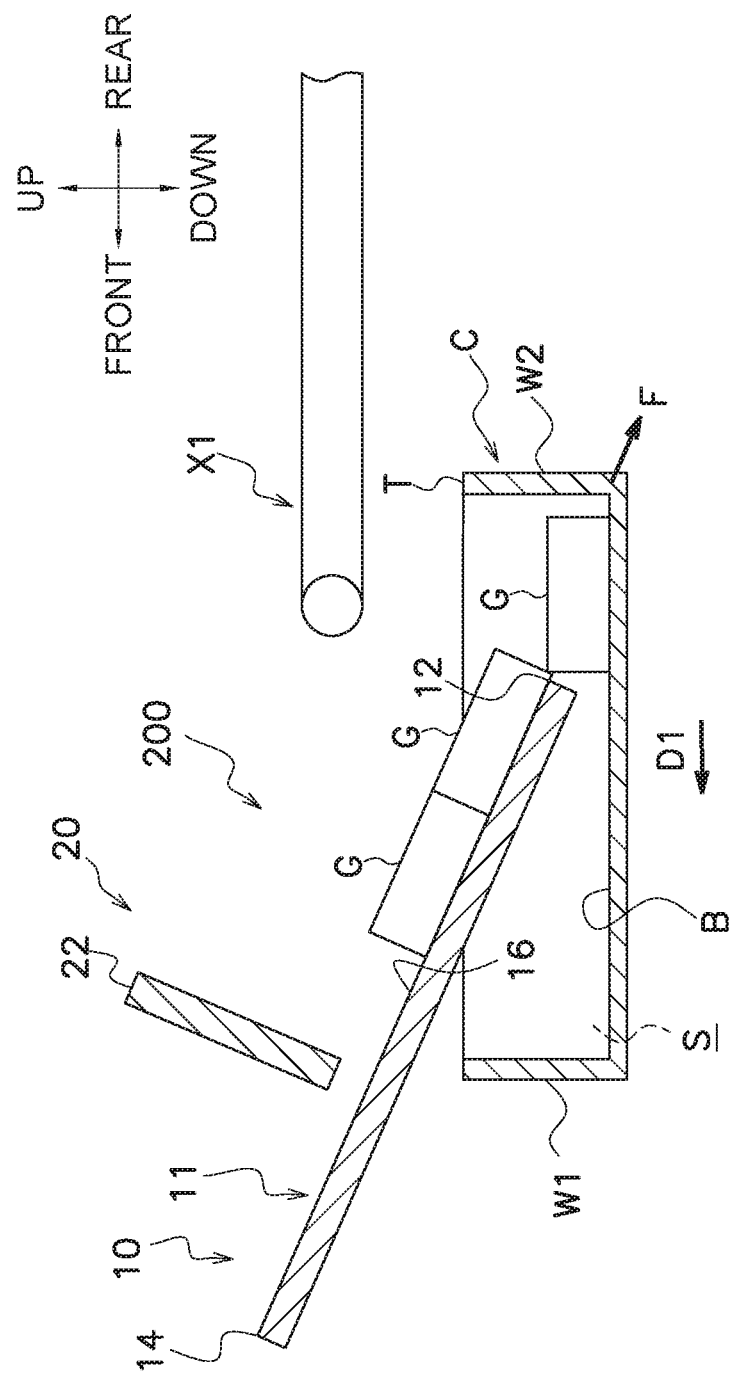
F I G. 12B

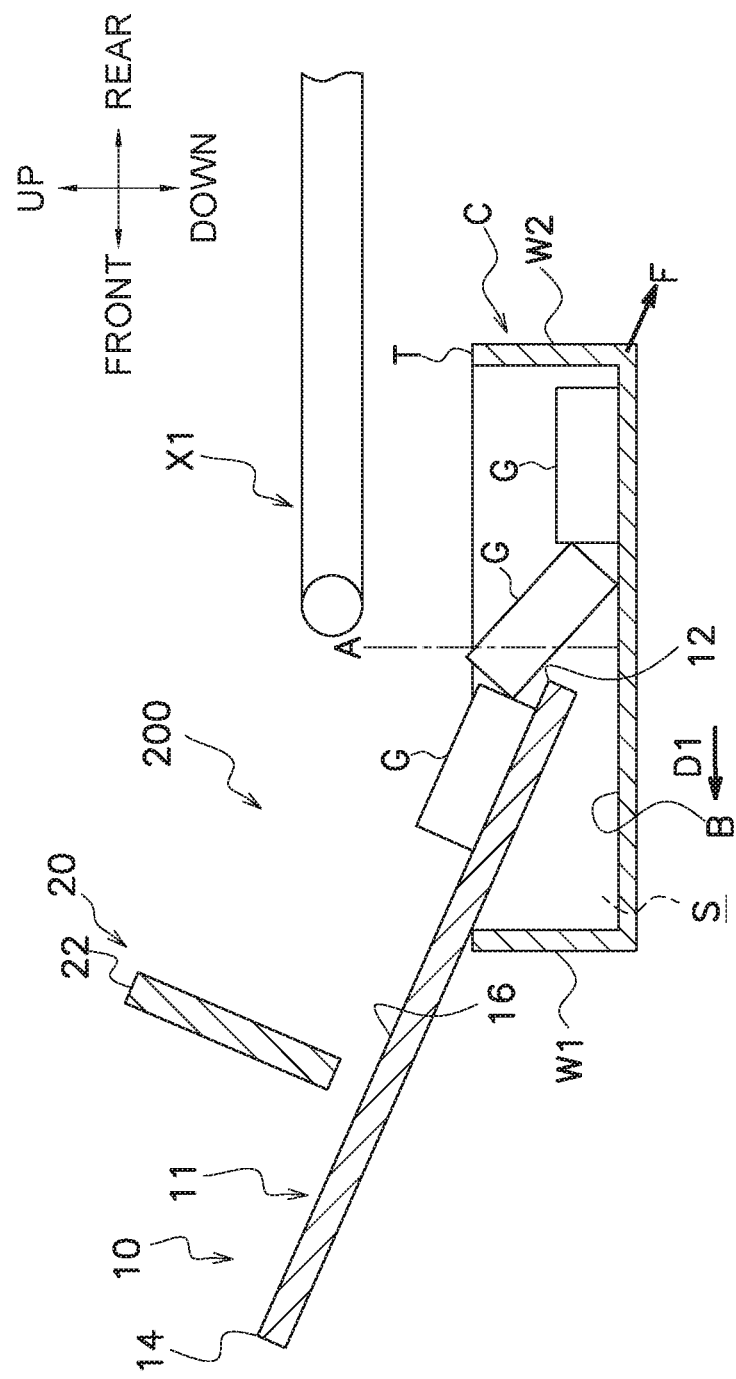
F I G. 12C

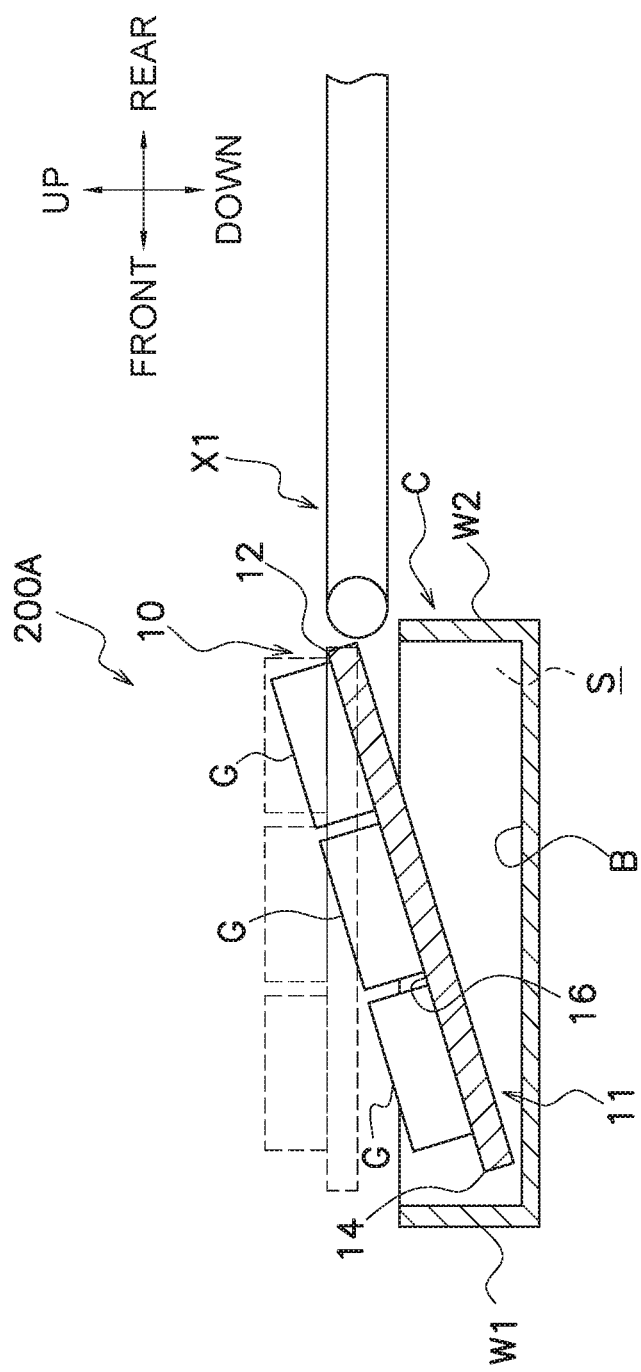
F I G. 14

ARTICLE TRANSFER DEVICE

CROSS-REFERENCE TO RELATED APPLICATIONS

This application claims priority to Japanese Patent Application No. JP 2019-179382, filed on Sep. 30, 2019. The entire disclosure of Japanese Patent Application No. 2019-179382 is hereby incorporated herein by reference.

BACKGROUND

Technical Field

The present invention relates to an article transfer device that transfers plural articles from a placement component to a container.

Related Art

Conventionally, as disclosed in JP-A No. 2011-251702, an article transfer device has been known which uses a plurality of suction units to grip, lift and move a plurality of articles from a placement component, re-orient the plurality of articles to a container packing position and then release the vacuum of the suction units thereby transferring the articles to a container.

SUMMARY OF INVENTION

Technical Problem

In the article transfer device of JP-A No. 2011-251702, since the articles are gripped by the plurality of suction units and are thereafter released, the amount of time required for the transfer process tends to be long.

It is an object of the present invention to provide an article transfer device that transfers plural articles from a placement component to a container and which can shorten the transfer time and is efficient.

Solution to Problem

An article transfer device pertaining to a first aspect, transfers a plurality of articles from a placement component including a placement surface on which plural articles are placed, the plural articles to a container. The article transfer device includes a drive unit and a control unit. The drive unit relatively moves the container and the placement component. The control unit controls the operation of the drive unit. The control unit controls the operation of the drive unit so that, when the articles on the placement component are above the container, the placement component is pulled out from between the container and the articles.

In this article transfer device, the amount of time required to transfer the articles to a container can be shortened compared to a case where the article transfer device grips the articles on the placement component, lifts them, moves them, and releases the articles above the container.

Furthermore, in a case where the articles are gripped by a suction unit, there is a concern that problems will occur, such as the articles sustaining damage when the articles are held by vacuum and gripped by the suction unit, or the articles not being completely having vacuum applied thereto and gripped by the suction unit such that the suction unit cannot grip the articles or drops the articles. In contrast, in this article transfer device, the articles do not need to be gripped to transfer them, so the occurrence of problems that can arise when the articles are gripped can be eliminated.

An article transfer device pertaining to a second aspect is the article transfer device pertaining to the first aspect, wherein when transferring the articles from the placement component to the container, the control unit controls the operation of the drive unit to change an angle defined between the placement surface of the placement component and a bottom surface of the container.

In this article transfer device, by changing the angle of the placement surface of the placement component with respect to the bottom surface of the container, inclination can be utilized to transfer the articles to the container. Furthermore, by utilizing inclination to transfer the articles to the container, damage to the articles can be inhibited compared to a case where the articles are vertically dropped.

An article transfer device pertaining to a third aspect is the article transfer device pertaining to the second aspect, wherein the container includes side walls. The side walls are disposed surrounding the bottom surface and form in the container a containment space that contains the articles. The placement component includes a plate-shaped first member. The first member has a first end, a second end, and the placement surface that extends between the first end and the second end. When transferring the articles from the placement component to the container, the control unit controls the operation of the drive unit to change the angle defined between the placement surface of the first member and the bottom surface of the container so that the first end of the first member is disposed in a lower position than the second end of the first member and in the containment space positioned lower than a top of the side walls.

In this article transfer device, the first end of the first member of the placement component at least temporarily enters the inside of the containment space that is lower than the top of the side walls of the container, so the articles can be moved from the first end side of the first member disposed in a relatively low position to the bottom surface of the container. Consequently, in this article transfer device, damage accompanying a vertical drop of the articles to the bottom surface of the container tends to be inhibited.

An article transfer device pertaining to a fourth aspect is the article transfer device pertaining to the third aspect, wherein when the control unit controls the operation of the drive unit so that the placement component is pulled out from between the container and the articles, the first end of the first member relatively moves in a first direction in the containment space to proximate the side wall of the container on a downstream side in the first direction.

In this article transfer device, the first end of the first member moves inside the containment space positioned lower than the top of the side walls of the container, so the articles can be moved from the first end side of the first member disposed in a relatively low position to the container. Consequently, in this article transfer device, damage accompanying a vertical drop of the articles to the bottom surface of the container tends to be inhibited.

An article transfer device pertaining to a fifth aspect is the article transfer device pertaining to the fourth aspect, wherein when the control unit controls the operation of the drive unit so that the placement component is pulled out from between the container and the articles, the first end of the first member relatively moves along the bottom surface of the container to the neighborhood of the side wall of the container on the downstream side in the first direction.

In this article transfer device, the first end of the first member moves at generally the same height position in the containment space to the neighborhood of the side wall of the container disposed on the downstream side in the first direction, so damage accompanying a vertical drop to the bottom surface of the container can be inhibited in regard to many of the articles transferred to the container.

An article transfer device pertaining to a sixth aspect is the article transfer device pertaining to the fourth aspect or the fifth aspect, wherein when the control unit controls the operation of the drive unit so that the placement component is pulled out from between the container and the articles, the first end of the first member relatively moves from proximate the side wall of the container on an upstream side in the first direction to proximate the side wall of the container on the downstream side in the first direction.

In this article transfer device, the first end of the first member moves in the containment space from proximate the side wall of the container disposed on the upstream side in the first direction to proximate the side wall of the container disposed on the downstream side in the first direction. Consequently, in this article transfer device, damage accompanying a vertical drop to the bottom surface of the container can be inhibited in regard to almost all the articles transferred to the container.

An article transfer device pertaining to the seventh aspect is the article transfer device pertaining to the fourth aspect or the fifth aspect, wherein the placement component further includes a plate-shaped second member. The second member has a third end, a fourth end, and the placement surface that extends between the third end and the fourth end. When transferring the articles from the placement component to the container, the control unit controls the operation of the drive unit to change the angle defined between the placement surface of the second member and the bottom surface of the container so that the third end of the second member is disposed in a lower position than the fourth end of the second member and in the containment space positioned lower than the top of the side walls. When the control unit controls the operation of the drive unit so that the placement component is pulled out from between the container and the articles, the third end of the second member relatively moves in a second direction opposite to the first direction in the containment space to proximate the side wall of the container on a downstream side in the second direction.

In this article transfer device, the first member and the second member can be utilized to inhibit damage accompanying a vertical drop to the bottom surface of the container in regard to many of the article transferred to the container.

An article transfer device pertaining to an eighth aspect is the article transfer device pertaining to any of the first aspect to the third aspect, wherein when the control unit controls the operation of the drive unit so that the placement component is pulled out from between the container and the articles, the drive unit parallelly moves the placement component along the placement surface.

In this article transfer device, the operation of pulling out the placement component from between the container and the articles can be realized with a relatively simple mechanism.

An article transfer device pertaining to a ninth aspect is the article transfer device pertaining to any of the third aspect to the seventh aspect, further includes a pusher. The pusher moves along the placement surface of the first member from the second end side to the first end side.

In this article transfer device, the articles can be smoothly moved along the placement surface of the first member downward to the container.

Advantageous Effects of Invention

The article transfer device of the invention can shorten the amount of time required to transfer articles.

BRIEF DESCRIPTION OF DRAWINGS

FIG. 3 is a side sectional view, along arrows III-III of FIG. 1, of the article transfer device of FIG. 1 seen from the left side;

FIG. 4D is a schematic drawing showing a portion of the operation of the article transfer device of FIG. 1, and is a side sectional view of the article transfer device seen from the left side;

FIG. 4E is a schematic drawing showing a portion of the operation of the article transfer device of FIG. 1, and is a side sectional view of the article transfer device seen from the left side;

FIG. 8 is a rear sectional view of an article transfer device of example modification 1C seen from the back side;

FIG. 10 is a side sectional view of an article transfer device of a second embodiment seen from the left side;

FIG. 12B is a schematic drawing showing a portion of the operation of the article transfer device of FIG. 10, and is a side sectional view of the article transfer device seen from the left side;

FIG. 12C is a schematic drawing showing a portion of the operation of the article transfer device of FIG. 10, and is a side sectional view of the article transfer device seen from the left side;

FIG. 14 is a side sectional view of an article transfer device of example modification 2A seen from the left side.

DETAILED DESCRIPTION

Figure 1:
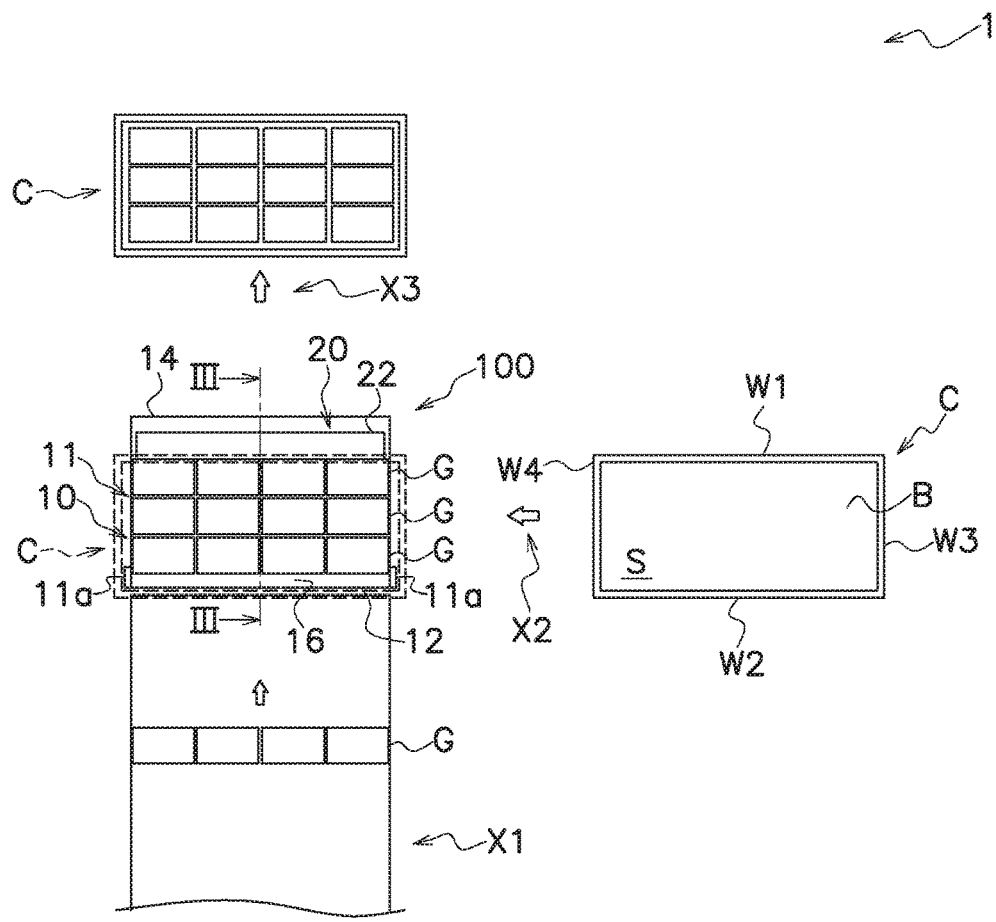
FIG. 1 is a plan view schematically illustrating an article transfer system including an article transfer device pertaining to a first embodiment.

Embodiments of the article transfer device of the invention will be described below. It will be noted that the embodiments described below are specific examples of the invention and are not intended to limit the technical scope of the invention. It will be understood that various changes may be made in configuration and detail without departing from the spirit and scope of the invention set forth in the claims.

It will be noted that in the following description expressions such as front, rear, left, and right may be used for convenience to describe positional relationships and directions. Unless otherwise specified, the directions indicated by these expressions accord with the directions of the arrows shown in the drawings.

Furthermore, in the following description expressions such as parallel, orthogonal, perpendicular, horizontal, and vertical may be used, and these expressions are not limited to cases where the things they describe are in a strict sense parallel, orthogonal, perpendicular, horizontal, or vertical and include cases where the things they describe are substantially parallel, orthogonal, perpendicular, horizontal, or vertical.

First Embodiment

An article transfer device 100 of a first embodiment of the invention will be described.

(1) Overview of Article Transfer System

An overview of the article transfer system 1 including the article transfer device 100 will be described with reference to FIG. 1. FIG. 1 is a plan view schematically illustrating the article transfer system 1 including the article transfer device 100.

The article transfer system 1 is a system that transfers a predetermined quantity of articles G into a container C and discharges the container C containing the articles G inside.

Here, the articles G are food packed in bags. For example, the articles G are bread packed in bags. Soft food such as bread is easily deformed and damaged by force acting thereon from outside. However, the type of the articles G that the article transfer device 100 transfers to the container C is not limited to a specific type. The article transfer device 100 can be utilized to transfer various types of articles to the container C.

Here, the container C is a container that is also called a food tray used mainly in the food industry. The container C is a thin container that is relatively short in height (its side walls W1 to W4 are relatively short in height) and is for transporting articles. The container C includes a bottom surface B and side walls W1 to W4 disposed surrounding the bottom surface B. The upper surface of the container C is open. In the article transfer system 1, the articles G are transferred to the container C through the opening in the upper surface. The bottom surface B of the container C is quadrilateral in shape when viewed from above. The side walls W1 to W4 of the container C are disposed along the four sides of the bottom surface B of the container C. The bottom surface B and the side walls W1 to W4 surrounding the bottom surface B form in the container C a containment space S that contains the articles G. It will be noted that the container C may be any container so long as at least its top is open, and the shape and so forth thereof are not limited to the shape and so forth of the container C exemplified here.

The article transfer system 1 mainly includes an article conveyance device X1, a container supply device X2, the article transfer device 100, and a container outbound conveyance device X3. The article transfer device 100 includes a placement component 10.

The article conveyance device X1 conveys the articles G from a process (e.g., a process of manufacturing the articles G) upstream of the article transfer system 1 and supplies the articles G to the article transfer device 100. Although this is not intended to limit the type of the device, the article conveyance device X1 is, for example, a belt conveyor. The article conveyance device X1 conveys the articles G so that a plurality of the articles G gather in an aligned state on the placement component 10 of the article transfer device 100. The article conveyance device X1 conveys the articles G in such a way that, as in FIG. 1 for example, a total of twelve articles G gather in an aligned state in three rows in the front and rear direction and in four rows in the right and left direction on the placement component 10 of the article transfer device 100. However, the quantity of the articles G that are gathered on the placement component 10 of the article transfer device 100 and the way in which the articles G are aligned on the placement component 10 are not limited to what is illustrated in FIG. 1 and may be appropriately decided.

The container supply device X2 conveys, and supplies to the article transfer device 100, empty (into which the articles G have not been put) containers C stored in a storage location not shown in the drawings. Specifically, the container supply device X2 supplies the container C under the placement component 10 of the article transfer device 100. Although this is not intended to limit the type of the device, the container supply device X2 is, for example, a roller conveyor. In FIG. 1, the container supply device X2 conveys the container C in the leftward direction from the right side of the article transfer device 100. However, this conveyance direction of the container C is merely illustrative, and the disposition of the container supply device X2 and the conveyance direction may be appropriately designed.

The article transfer device 100 transfers the plural articles G placed on the placement component 10 from the placement component 10 to the container C. The article transfer device 100 specifically transfers the articles G to the container C by relatively moving the container C and the placement component 10 so that, when the articles G on the placement component 10 are above the container C, the placement component 10 is pulled out from between the container C and the articles G. Details about the article transfer device 100 will be described later.

The container outbound conveyance device X3 conveys out from the article transfer device 100 the container C to which the articles G have been transferred by the article transfer device 100. In FIG. 1, the container outbound conveyance device X3 conveys the container C forward from the article transfer device 100, but this conveyance direction of the container C is merely illustrative, and the conveyance direction of the container outbound conveyance device X3 may be appropriately decided. The container C that has been conveyed to a predetermined position by the container outbound conveyance device X3 is stacked on a cart (not shown in the drawings) by a container transfer device (not shown in the drawings). The cart is a device for moving the container C from the transfer system 1.

(2) Detailed Configuration of Article Transfer Device

Figure 2:
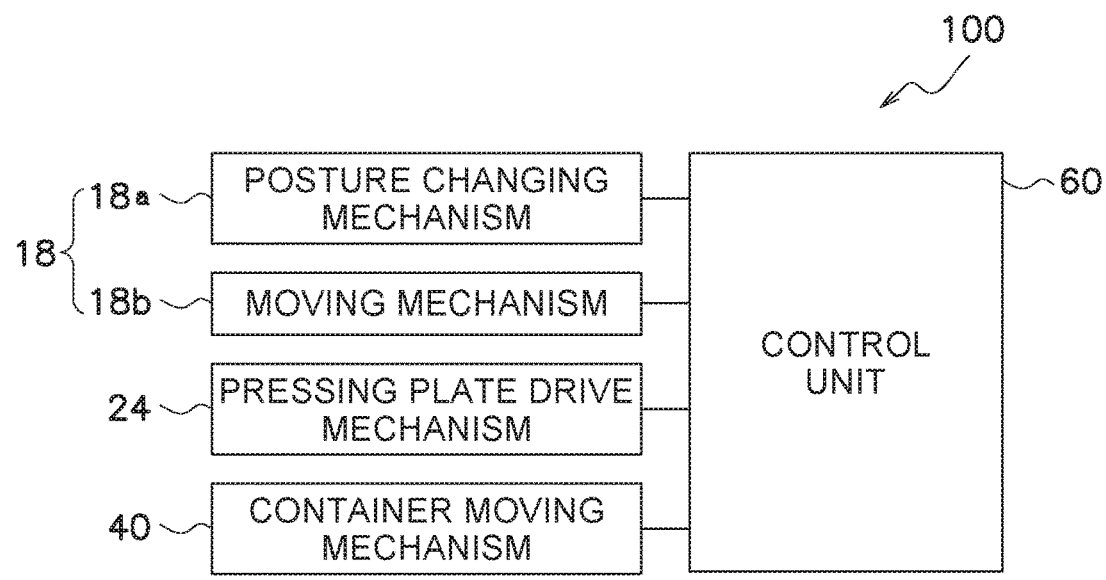
FIG. 2 is a control block diagram of the article transfer device of FIG. 1.

The detailed configuration of the article transfer device 100 will be described with reference to FIG. 2 and FIG. 3 in addition to FIG. 1. FIG. 2 is a control block diagram of the article transfer device 100. FIG. 3 is a side sectional view, along arrows III-III of FIG. 1, of the article transfer device 100 seen from the left side of FIG. 1.

The article transfer device 100 includes the placement component 10, a placement component drive unit 18, a pusher 20, a roller 30, a container moving mechanism 40, and a control unit 60. Below, details regarding each of these configurations will be described.

(2-1) Placement Component

The placement component 10 receives the plural articles G supplied by the article conveyance device X1 and retains, on a placement surface 16, the articles G until they are transferred to the container C.

The placement component 10 mainly includes a plate-shaped first member 11. In the present embodiment, the first member 11 is a planar member that is quadrilateral in shape as shown in FIG. 1. The first member 11 has a first end 12, a second end 14, and the placement surface 16 that extends between the first end 12 and the second end 14. The first end 12 is an end portion that is disposed on the rear side and extends in the right and left direction. The second end 14 is an end portion that is disposed on the front side and extends in the right and left direction.

The first member 11 is placed on top of the roller 30 as in FIG. 3. The roller 30 is a freely rotating member whose rotational axis coincides with the right and left direction. Furthermore, right and left end portions in the neighborhood of the rear end portion of the first member 11 are supported by support members 11a as in FIG. 1. In the description hereinbelow, the term "in the neighborhood of" is basically synonymous with or similar to the terms "proximate a" or "adjacent to", or, "in the vicinity of" a specific feature or specific structure of the invention.

In the present embodiment, the articles G supplied by the article conveyance device X1 are gathered so as to line up in four rows in the right and left direction and three rows in the front and rear direction on the placement surface 16 of the first member 11 as in FIG. 1.

When the articles G are supplied by the article conveyance device X1 to the article transfer device 100, the placement surface 16 of the first member 11 is generally horizontal as in FIG. 3. In other words, the rear end portion (the first end 12) of the first member 11 and the front end portion (the second end 14) of the first member 11 are disposed generally at the same height. The first end 12 of the first member 11 is disposed adjacent to the end portion of the conveyance surface of the article conveyance device X1. The placement surface 16 of the first member 11 is disposed at generally the same height as the height of the conveyance surface of the article conveyance device X1. In other words, when the articles G are supplied by the article conveyance device X1 to the article transfer device 100, the support members 11a and the roller 30 support the first member 11 in such a way that the placement surface 16 of the first member 11 is disposed at generally the same height as the height of the conveyance surface of the article conveyance device X1. The article conveyance device X1 conveys the articles G forward from the rear side—that is, the first end 12 side—of the placement component 10. The articles G moving from the article conveyance device X1 to the placement surface 16 of the placement component 10 move forward on the placement surface 16 by inertia. It will be noted that the articles G disposed in the frontmost row on the placement surface 16 come into contact with a later-described pressing plate 22 of the pusher 20 disposed above the front portion of the placement surface 16 of the first member 11, whereby forward movement of the articles G is regulated by the pressing plate 22. The articles G disposed in the second and subsequent rows from the front on the placement surface 16 (the articles G in the second row and the third row from the front in the example of FIG. 1) come into contact with the articles G in front of them, whereby forward movement of the articles G is regulated.

The movement of the first member 11 after a predetermined number (in the present embodiment, twelve) of the articles G have been gathered on the placement surface 16 will be described later.

(2-2) Placement Component Drive Unit

The placement component drive unit 18 is an example of a drive unit.

The placement component drive unit 18 moves the container C, which is disposed under the placement component 10 and to which the articles G are to be transferred, and the placement component 10 relative to each other. Specifically, the placement component drive unit 18 relatively moves the container C disposed in an article transfer position P1 and the first member 11 of the placement component 10. Furthermore, the placement component drive unit 18 changes the angle formed by the placement surface 16 of the placement component 10 and the bottom surface B of the container C disposed in the article transfer position P1.

It will be noted that the article transfer position P1 is a position in which the container C is disposed when the article transfer device 100 transfers the articles G to the container C. In the present embodiment, the container C does not move from the article transfer position P1 until the transfer of the articles G to the container C by the article transfer device 100 is generally complete. Furthermore, in the present embodiment, the bottom surface B of the container C disposed in the article transfer position P is horizontal.

The placement component drive unit 18 includes a posture changing mechanism 18a and a moving mechanism 18b. The posture changing mechanism 18a and the moving mechanism 18b are mechanisms that change the position and/or the posture of the first member 11 by moving at least part of the first member 11 in a predetermined direction. The posture changing mechanism 18a and the moving mechanism 18b include air cylinders, for example, and use the air cylinders to move at least part of the first member 11. However, the drive sources of the posture changing mechanism 18a and/or the moving mechanism 18b are not limited to air cylinders, and other types of drive sources, such as motors for example, may be utilized to move at least part of the first member 11. Furthermore, so long as it can move the first member 11 as described below, a single mechanism may realize both the functions of the posture changing mechanism 18a and the moving mechanism 18b.

The posture changing mechanism 18a changes the angle α (FIG. 4A) formed by the placement surface 16 of the placement component 10 and the bottom surface B of the container C. Specifically, the posture changing mechanism 18a changes, by switching the state of the first member 11 between a first state and a second state, the angle α formed by the placement surface 16 of the placement component 10 and the bottom surface B of the container C that is horizontal. When the first member 11 is in the first state, the placement surface 16 is horizontal. When the first member 11 is in the second state, the placement surface 16 is inclined by an angle α with respect to the horizontal plane. The posture changing mechanism 18a switches the first member 11 between the first state and the second state by moving in the up and down direction the support members 11a that are arranged in the neighborhood of the rear end of the first member 11. The first state is a state that the first member 11 takes when the article conveyance device X1 gathers the articles G on the placement surface 16 of the placement component 10. The second state is a state that the first member 11 takes when the transfer of the articles G from the placement component 10 to the container C starts. When the first member 11 is in the second state, the first end 12 is disposed in a lower position than the second end 14. In the present embodiment, when the first member 11 is in the second state, the rear end side of the first member 11 is disposed in a lower position than the front end side of the first member 11. In other words, when the first member 11 is in the second state, the placement surface 16 slopes downward from the front side to the rear side. Furthermore, when the first member 11 is in the second state, the first end 12 is disposed in the containment space S positioned lower than a top T of the side walls W1 to W4 of the container C disposed in the article transfer position P1.

The moving mechanism 18b relatively moves the container C disposed in the article transfer position P1 and the placement component 10. Specifically, the moving mechanism 18b relatively moves the container C disposed in the article transfer position P1 and the placement component 10 by moving the first member 11. When the articles G on the placement component 10 are above the container C disposed in the article transfer position P1, the moving mechanism 18b moves the first member 11 to thereby pull out the placement component 10 from between the container C and the articles G. At the point in time when the moving mechanism 18b starts moving the first member 11 to transfer the articles G, the first member 11 is in the second state. At the point in time when the moving mechanism 18b starts moving the first member 11 to transfer the articles G, the first end 12 of the first member 11 is disposed in the containment space S of the container C.

How the moving mechanism 18b moves the first member 11 is described further below. In the following description, to avoid lengthy description, the expression "in the transferring movement of the placement component 10" may be used instead of the expression "when the placement component 10 is moved so that the placement component 10 is pulled out from between the container C and the articles G."

Preferably, in the transferring movement of the placement component 10, the moving mechanism 18b relatively moves the first end 12 of the first member 11 in the containment space S in a first direction D1. In the transferring movement of the placement component 10, the moving mechanism 18b relatively moves the first end 12 of the first member 11 to the neighborhood of the side wall of the container C disposed on the downstream side in the first direction D1. Preferably, in the transferring movement of the placement component 10, the moving mechanism 18b relatively moves the first end 12 of the first member 11 in the first direction D1 to the neighborhood of the side wall of the container C disposed on the downstream side in the first direction D1 so that the distance between the first end 12 and the bottom surface B of the container C becomes equal to or less than ½ the height of the side walls W1 to W4. In the present embodiment, the first direction D1 is the forward direction. Furthermore, in the present embodiment, the side wall of the container C disposed on the downstream side in the first direction D1 is the side wall W1. Specifically, the moving mechanism 18b relatively moves the support members 11a, which supports the first member 11 at the right and left direction end portions of the rear side (the first end 12 side) of the first member 11, in the first direction D1 to the neighborhood of the side wall W1 of the container C disposed on the downstream side in the first direction D1.

More preferably, in the transferring movement of the placement component 10, the moving mechanism 18b relatively moves the first end 12 of the first member 11 along the bottom surface B of the container C in the containment space S in the first direction D1, to the neighborhood of the side wall W1 of the container C disposed on the downstream side in the first direction D1.

Furthermore, preferably, when moving the placement component 10, the moving mechanism 18b relatively moves the first end 12 of the first member 11 in the first direction D1 from the neighborhood of the side wall W2 of the container C disposed on the upstream side in the first direction D1 to the neighborhood of the side wall W1 of the container C disposed on the downstream side in the first direction D1.

When the moving mechanism 18b relatively moves the first end 12 of the first member 11 in the first direction D1, the inclination of the first member 11 placed on the roller 30 with respect to the horizontal plane increases as the first end 12 of the first member 11 moves in the first direction D1 closer to the side wall W1 (see FIG. 4B to FIG. 4E).

(2-3) Pusher

When transferring the articles G from the placement component 10 to the container C, the pusher 20 moves along the placement surface 16 of the first member 11 to assist the moving of the articles G on the placement surface 16 of the first member 11 to the container C.

As shown in FIG. 2 and FIG. 3, the pusher 20 mainly includes a pressing plate 22 and a pressing plate drive mechanism 24. The pressing plate drive mechanism 24 is a mechanism that moves the pressing plate 22. The pressing plate drive mechanism 24 includes a drive mechanism such as an air cylinder or a motor, for example.

The pressing plate 22 here is a plate-shaped member. However, the shape of the pressing plate 22 may be arbitrarily selected. The pressing plate 22 is disposed above the front portion of the placement surface 16 of the first member 11 in the first state. The pressing plate 22 regulates forward movement of the articles G when the article conveyance device X1 moves the articles G to the placement surface 16 of the first member 11 in the first state.

Figure 4A:
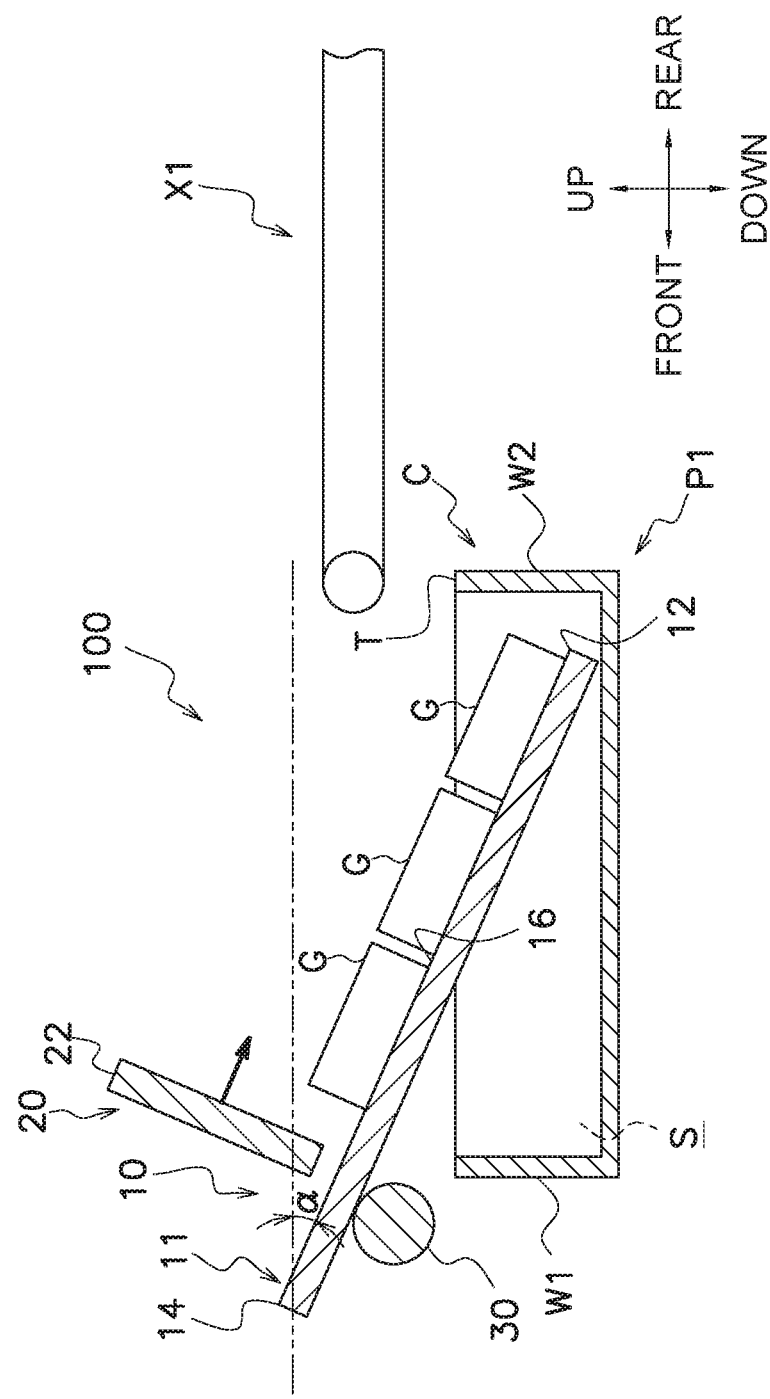
FIG. 4A is a schematic drawing showing a portion of the operation of the article transfer device of FIG. 1, and is a side sectional view of the article transfer device seen from the left side.
Figure 4B:
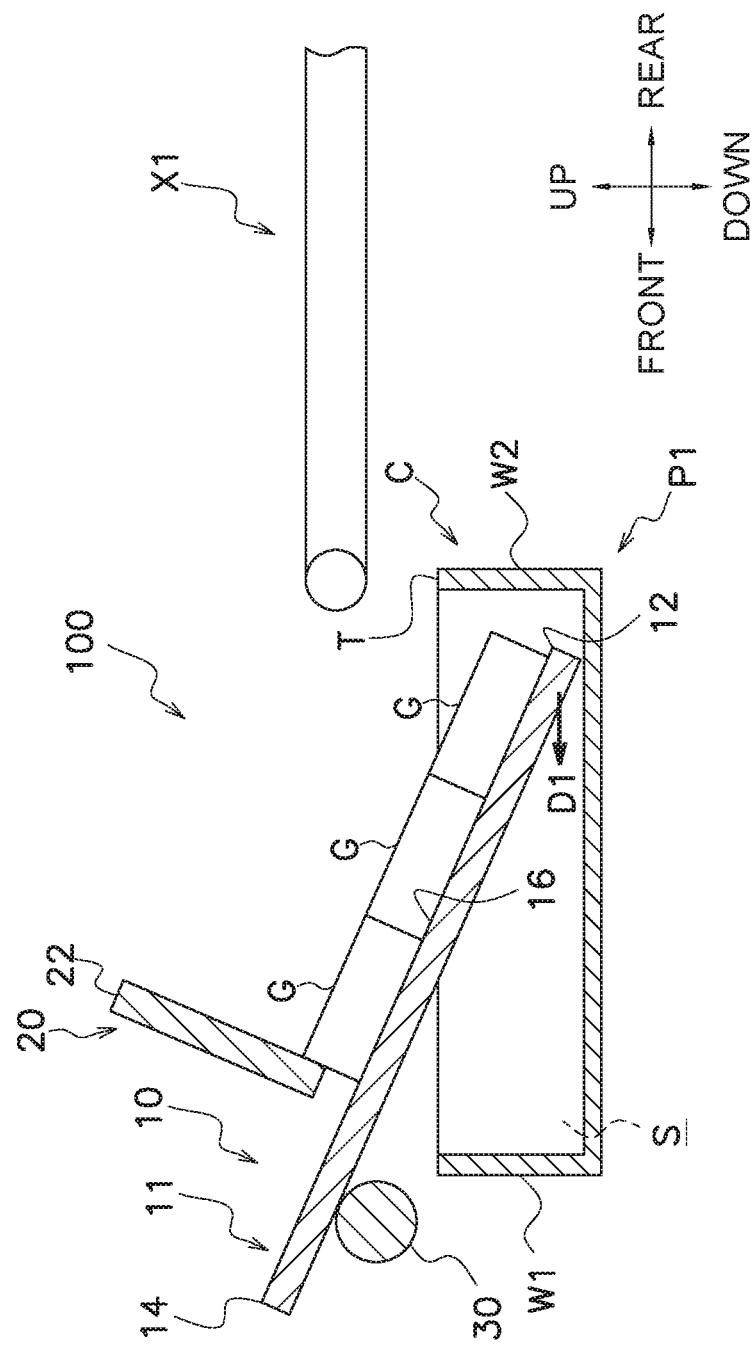
FIG. 4B is a schematic drawing showing a portion of the operation of the article transfer device of FIG. 1, and is a side sectional view of the article transfer device seen from the left side.

The pusher 20 moves the pressing plate 22 along the placement surface 16 of the first member 11 from the second end 14 side to the first end 12 side when the posture changing mechanism 18a has changed the state of the first member 11 having the articles G placed on the placement surface 16 from the first state to the second state (see FIG. 4A and FIG. 4B). As a result, the pressing plate 22 contacts the articles G on the placement surface 16 and assists the moving or sliding of the articles G along the placement surface 16 of the first member 11 to the container C.

(2-4) Roller

The roller 30 is a member that is disposed under the first member 11 and supports the first member 11 from its underside as in FIG. 3. The first member 11 is placed on the roller 30. The roller 30 freely rotates about a rotational axis that extends horizontally in the right and left direction.

(2-5) Container Moving Mechanism

In the present embodiment, the container moving mechanism 40 is a mechanism that moves the container C in the up and down direction. The container moving mechanism 40 includes a drive source such as an air cylinder and a motor not shown in the drawings and uses these drive sources to move, in the up and down direction, a support (not shown in the drawings) that supports the container C.

Specifically, the container moving mechanism 40 moves the container C supplied from the container supply device X2 to the article transfer position P above. Furthermore, the container moving mechanism 40 moves the container C downward to hand over the container C to the container outbound conveyance device X3 after the moving mechanism 18b has finished moving the first member 11.

(2-6) Control Unit

The control unit 60 is a control device that controls the operation of each part of the article transfer device 100. In the present embodiment, the control unit 60 is a control device dedicated to the article transfer device 100. However, the control unit 60 is not limited to the control device dedicated to the article transfer device 100 and may be a device that also controls the operation of other devices. For example, the control unit 60 may be a device that controls the operation of at least some of the article conveyance device X1, the container supply device X2, and the container outbound conveyance device X3 in addition to the article transfer device 100.

In the present embodiment, the control unit 60 is a computer that has a processor such as a CPU and a storage device (not shown in the drawings). The control unit 60 reads out and executes a program for controlling the operation of the article transfer device 100 stored in the storage device and controls the operation of the article transfer device 100 in accordance with this program. It will be noted that the control unit 60 is not limited to being realized by software. The control unit 60 may be realized by hardware, or may be realized by the cooperation of software and hardware, so long as it causes the article transfer device 100 to execute the operation described below.

As shown in FIG. 2, the control unit 60 is electrically connected to the placement component drive unit 18 including the posture changing mechanism 18a and the moving mechanism 18b, the pressing plate drive mechanism 24, and the container moving mechanism 40. The control unit 60 controls the operation of the posture changing mechanism 18a, the moving mechanism 18b, the pressing plate drive mechanism 24, and the container moving mechanism 40. Furthermore, the control unit 60 exchanges various signals with the article conveyance device X1, the container supply device X2, and the container outbound conveyance device X3.

How the control unit 60 controls the article transfer device 100 will be described in the description of the operation of the article transfer device 100.

(3) Operation of Article Transfer Device

The operation of the article transfer device 100 will be described with reference to FIG. 4A to FIG. 4F and FIG. 5 in addition to FIG. 3. FIG. 4A to FIG. 4F are drawings for describing the operation of the article transfer device 100 and show the operation of the article transfer device 100 in a time series. FIG. 4A to FIG. 4F are, like FIG. 3, side sectional views, along line III-III of FIG. 1, of the article transfer device 100 seen from the left side of FIG. 1. FIG. 5 is a flowchart for describing the operation of the article transfer device 100.

Here, the operation of the article transfer device 100 will be described starting with a state in which the predetermined quantity of the articles G have been placed on the placement surface 16 of the placement component 10, the first member 11 is in the first state, and the container moving mechanism 40 has moved the container C to the article transfer position P1.

First, when transferring the articles G from the placement component 10 to the container C, the control unit 60 controls the operation of the placement component drive unit 18 to change the posture of the placement component 10. In other words, when transferring the articles G from the placement component 10 to the container C, the control unit 60 controls the operation of the placement component drive unit 18 to change the angle formed by the placement surface 16 of the placement component 10 and the bottom surface B of the container C disposed in the article transfer position P1 (step S). The control unit 60, by changing the angle formed by the placement surface 16 and the bottom surface B of the container C disposed in the article transfer position P, disposes the first end 12 of the first member 11 in a lower position than the second end 14 of the first member 11 and in the containment space S positioned lower than the top T of the side walls W1 to W4 of the container C (see FIG. 4A). Specifically, the control unit 60 controls the operation of the posture changing mechanism 18a to change the state of the first member 11 from the first state in which the placement surface 16 is horizontal (see FIG. 3) to the second state in which the placement surface 16 is inclined by the angle α with respect to the horizontal plane (see FIG. 4A). It will be noted that when the posture changing mechanism 18a has changed the state of the first member 11 to the second state to change the angle α defined between the placement surface 16 and the bottom surface B of the container C disposed in the article transfer position P1, the first end 12 of the first member 11 is disposed in the neighborhood of the lower end of the side wall W2 of the container C (see FIG. 4A). When the state of the first member 11 changes to the second state, the placement surface 16 of the first member 11 slopes downward toward the rear side (the first end 12 side).

Next, the control unit 60 controls the operation of the pusher 20 to move the pressing plate 22 of the pusher 20 along the placement surface 16 of the first member 11 of the placement component 10 from the side of the second end 14 of the first member 11 to the side of the first end 12 of the first member 11 (step S2; see FIG. 4A and FIG. 4B). In other words, the control unit 60 moves the pressing plate 22 closer to the bottom surface B of the container C disposed in the article transfer position P1.

Next, the control unit 60 controls the operation of the placement component drive unit 18 so that, when the articles G on the placement component 10 are above the container C being in the article transfer position P1, the placement component 10 is pulled out from between the container C and the articles G. Specifically, the control unit 60 controls the operation of the moving mechanism 18b so that the first end 12 of the first member 11 relatively moves in the first direction D1 so that the placement component 10 is pulled out from between the container C disposed in the article transfer position P1 and the articles G (step S3).

Figure 4C:
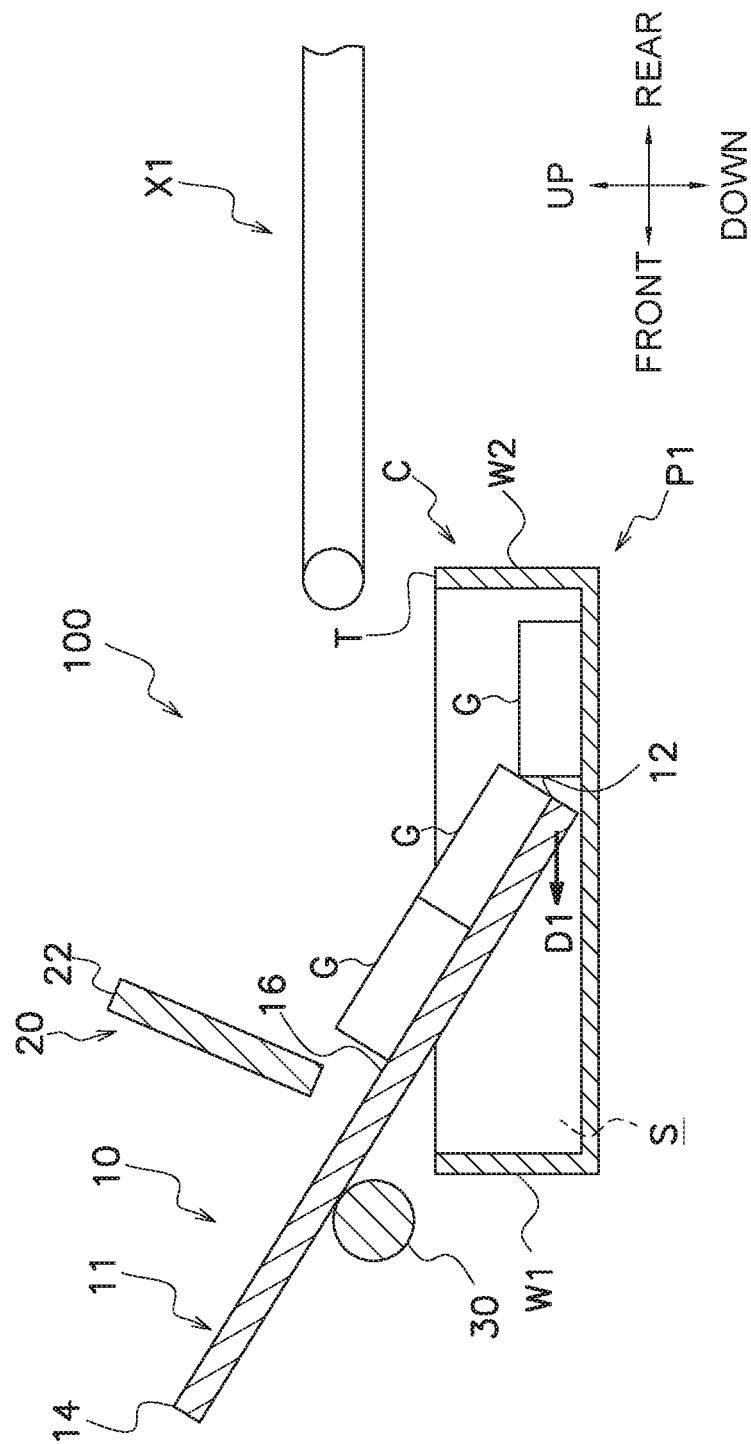
FIG. 4C is a schematic drawing showing a portion of the operation of the article transfer device of FIG. 1, and is a side sectional view of the article transfer device seen from the left side.
Figure 5:
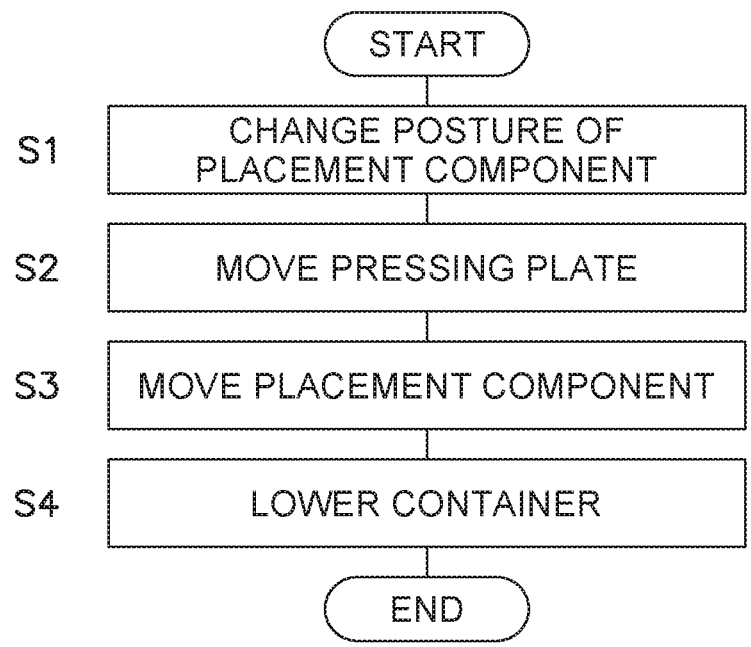
FIG. 5 is a flowchart showing an example of the operation of the article transfer device of FIG. 1.

Specifically, the control unit 60 controls the operation of the moving mechanism 18b so that the moving mechanism 18b relatively moves, in the first direction D1, the support members 11a supporting the first member 11 in the neighborhood of the first end 12 to the neighborhood of the side wall W1 of the container C disposed on the downstream side in the first direction (see FIG. 4C to FIG. 4E). Preferably, the moving mechanism 18b moves the support members 11a to relatively move the first end 12 of the first member 11 along the bottom surface B of the container C in the containment space S in the first direction D1 to the neighborhood of the side wall W of the container C. As the moving mechanism 18*b* moves the first member 11 in the first direction D1, the angle of the placement surface 16 of the first member 11 with respect to the horizontal plane gradually increases and gradually approaches 90° (see FIG. 4C to FIG. 4E). Because of this change in angle, the articles G on the placement surface 16 are less likely to remain on the placement surface 16 and are influenced by gravity to slide along the placement surface 16. In other words, as a result of an increased angle of inclination of the first member 11, gravity has a greater influence on the articles G. As a result of the moving mechanism 18*b* moving the support members 11*a* in the first direction D1, the articles G on the placement surface 16 of the first member 11 slide along the placement surface 16 and are transferred to the bottom surface B of the container C sequentially from the rear while maintaining the aligned state they had on the placement surface 16 (see FIG. 4C to FIG. 4E).

Figure 4F:
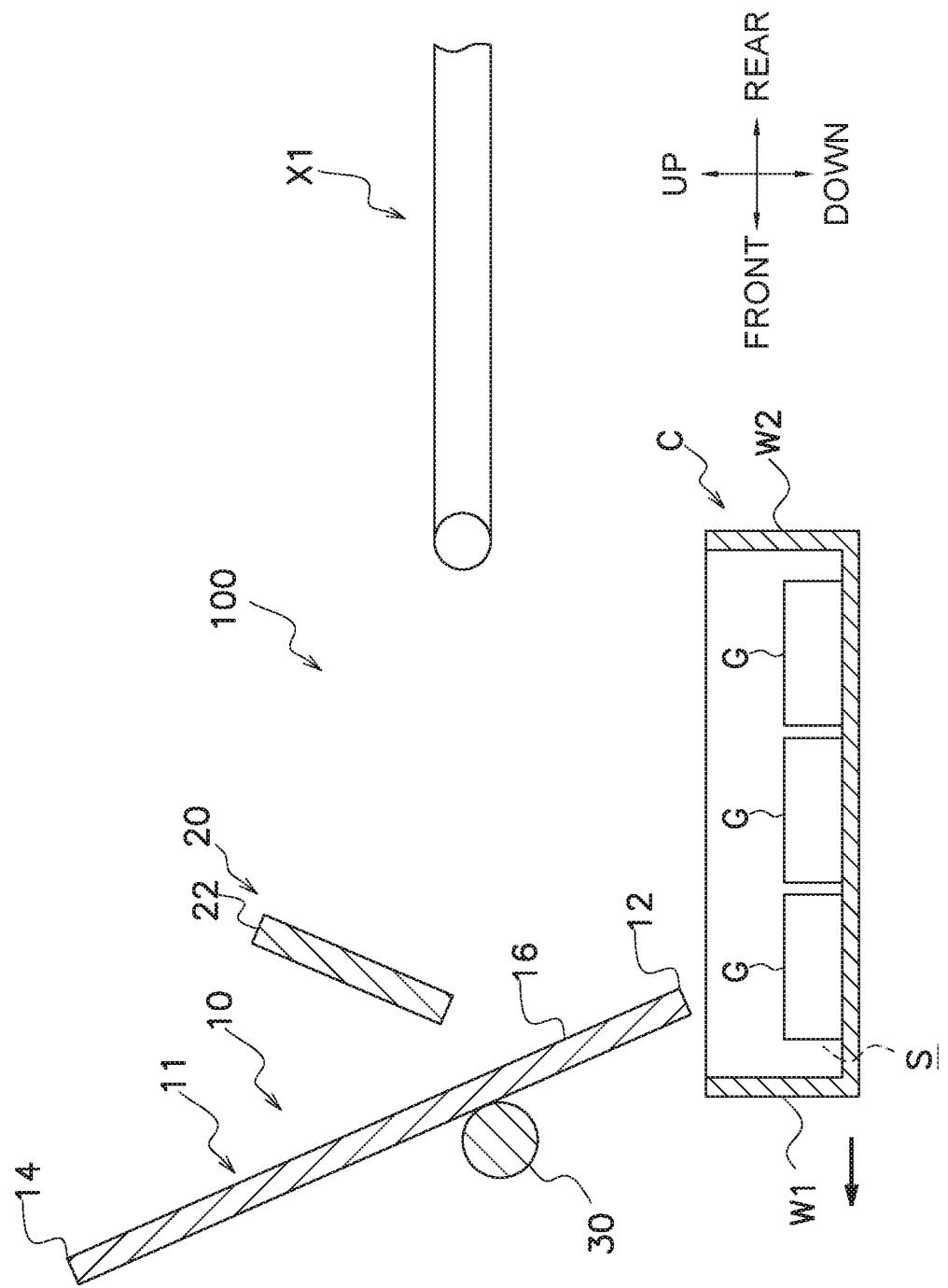
FIG. 4F is a schematic drawing showing a portion of the operation of the article transfer device of FIG. 1, and is a side sectional view of the article transfer device seen from the left side.

Next, the control unit 60 controls the operation of the container moving mechanism 40 to move the container C downward from the article transfer position P1 (step S4; see FIG. 4E and FIG. 4F). The container moving mechanism 40 hands over to the container outbound conveyance device X3 the container C to which the articles G have been transferred. The container outbound conveyance device X3 conveys out the container C to which the articles G have been transferred, and which has been handed over from the article transfer device 100.

It will be noted that when the transfer of the articles G to the container C ends, the control unit 60 drives the placement component drive unit 18 to return the first member 11 to the state illustrated in FIG. 3, and moves to the article transfer position P an empty container C the container supply device X2 supplies.

(4) Characteristics of Article Transfer Device (4-1)

The article transfer device 100 of the present embodiment transfers, from the placement component 10 including the placement surface 16 on which the plural articles G are placed, the plural articles G to the container C. The article transfer device 100 includes the placement component drive unit 18 and the control unit 60. The placement component drive unit 18 relatively moves the container C and the placement component 10. The control unit 60 controls the operation of the placement component drive unit 18. The control unit 60 controls the operation of the placement component drive unit 18 so that, when the articles G on the placement component 10 are above the container C, the placement component 10 is pulled out from between the container C and the articles G.

In the article transfer device 100, the amount of time required to transfer the articles can be shortened compared to a case where the article transfer device grips the articles G on the placement component 10, moves them, and releases the articles G above the container C.

Furthermore, in a case where the articles G are gripped by a suction unit, there is a concern that problems will occur, such as the articles G sustaining damage when the articles G are sucked and gripped by the suction unit, or the articles G not being completely sucked and gripped by the suction unit such that the suction unit cannot grip the articles G or drops the articles G. In contrast, in the article transfer device 100, the articles G do not need to be gripped to transfer them, so the occurrence of problems that can arise when the articles G are gripped can be eliminated.

(4-2)

In the article transfer device 100 of the present embodiment, when transferring the articles G from the placement component 10 to the container C, the control unit 60 controls the operation of the placement component drive unit 18 to change the angle formed by the placement surface 16 of the placement component 10 and the bottom surface B of the container C.

In the article transfer device 100, by changing the angle of the placement surface 16 of the placement component 10 with respect to the bottom surface B of the container C, inclination can be utilized to transfer the articles G to the container C. Furthermore, by utilizing inclination to transfer the articles G to the container C, damage to the articles G can be inhibited compared to a case where the articles G are vertically dropped.

(4-3)

In the article transfer device 100 of the present embodiment, the container C includes the side walls W1 to W4. The side walls W1 to W4 are disposed surrounding the bottom surface B of the container C and form in the container C the containment space S that contains the articles G. The placement component 10 includes the plate-shaped first member 11. The first member 11 has the first end 12, the second end 14, and the placement surface 16 that extends between the first end 12 and the second end 14. When transferring the articles G from the placement component 10 to the container C, the control unit 60 controls the operation of the placement component drive unit 18 to change the angle formed by the placement surface 16 of the first member 11 and the bottom surface B of the container C so that the first end 12 of the first member 11 is disposed in a lower position than the second end 14 of the first member 11 and in the containment space S positioned lower than the top T of the side walls W1 to W4.

In the article transfer device 100, the first end 12 of the first member 11 of the placement component 10 at least temporarily enters the inside of the containment space S positioned lower than the top T of the side walls W1 to W4 of the container C. For that reason, in the article transfer device 100, the articles G can be moved from the first end 12 side of the first member 11 disposed in a relatively low position to the bottom surface B of the container C. Consequently, in the article transfer device 100, damage accompanying a vertical drop of the articles G to the bottom surface B of the container C tends to be inhibited.

(4-4)

In the article transfer device 100 of the present embodiment, when the control unit 60 controls the operation of the placement component drive unit 18 so that the placement component 10 is pulled out from between the container C and the articles G, the first end 12 of the first member 11 relatively moves in the first direction D1 in the containment space S to the neighborhood of the side wall W1 of the container C disposed on the downstream side in the first direction D1.

In the article transfer device 100, the first end 12 of the first member 11 moves inside the containment space S positioned lower than the top T of the side walls W1 to W4 of the container C, so the articles G can be moved from the first end 12 side of the first member 11 disposed in a relatively low position to the container C. Consequently, in the article transfer device 100, damage accompanying a vertical drop of the articles G to the bottom surface B of the container C tend to be inhibited.

(4-5)

In the article transfer device 100 of the present embodiment, when the control unit 60 controls the operation of the placement component drive unit 18 so that the placement component 10 is pulled out from between the container C and the articles G, the first end 12 of the first member 11 relatively moves along the bottom surface B of the container C to the neighborhood of the side wall W1 of the container C disposed on the downstream side in the first direction D1.

In the article transfer device 100, the first end 12 of the first member 11 moves at generally the same height position in the containment space S to the neighborhood of the side wall W1 of the container C disposed on the downstream side in the first direction D. For that reason, damage accompanying a vertical drop to the bottom surface B of the container C can be inhibited in regard to many of the articles G transferred to the container C.

(4-6)

In the article transfer device 100 of the present embodiment, when the control unit 60 controls the operation of the placement component drive unit 18 so that the placement component 10 is pulled out from between the container C and the articles G, the first end 12 of the first member 11 relatively moves from the neighborhood of the side wall W2 of the container C disposed on the upstream side in the first direction D1 to the neighborhood of the side wall W1 of the container C disposed on the downstream side in the first direction D1.

In the article transfer device 100, the first end 12 of the first member 11 relatively moves in the containment space S from the neighborhood of the side wall W2 of the container C disposed on the upstream side in the first direction D1 to the neighborhood of the side wall W1 of the container C disposed on the downstream side in the first direction D. Consequently, in the article transfer device 100, damage accompanying a vertical drop to the bottom surface B of the container C can be inhibited in regard to almost all the articles G transferred to the container C.

(4-7)

The article transfer device 100 of the present embodiment has the pusher 20. The pusher 20 moves along the placement surface 16 of the first member 11 of the placement component 10 from the second end 14 side of the first member 11 to the first end 12 side of the first member 11. Specifically, the pressing plate 22 of the pusher 20 moves along the placement surface 16 of the first member 11 of the placement component 10 from the second end 14 side of the first member 11 to the first end 12 side of the first member 11.

In the article transfer device 100, the articles G can be smoothly moved along the placement surface 16 of the first member 11 downward to the container C.

(5) Example Modifications

Example modifications of the first embodiment will be described below. It will be noted that some or all of the content of each example modification may be combined with the content of the above embodiment or the content of another example modification to the extent that they are not mutually incompatible.

(5-1) Example Modification 1A

In the article transfer device 100 of the above embodiment, the moving mechanism 18b relatively moves the first end 12 of the first member 11 along the bottom surface B of the container C in the first direction D1 in the containment space S to the neighborhood of the side wall W1 of the container C disposed on the downstream side in the first direction D1.

However, the way in which the first member 11 moves is not limited to this. For example, the moving mechanism 18b may move the first member 11 so that, as the first member 11 moves in the first direction D1, the first end 12 of the first member 11 gradually moves to a higher position. However, even in a case where the moving mechanism 18b is configured in this way, it is preferred that the moving mechanism 18b relatively move the first end 12 of the first member 11 at as low a height position as possible to the neighborhood of the side wall W1 of the container C disposed on the downstream side in the first direction D1. Specifically, it is preferred that the moving mechanism 18b move the first end 12 of the first member 11 in the containment space S to the neighborhood of the side wall W1 of the container C disposed on the downstream side in the first direction D1. By configuring the moving mechanism 18b in this way, damage caused by the articles G dropping tends to be inhibited when the articles G move from the placement surface 16 of the first member 11 to the bottom surface B of the container C.

Figure 6:
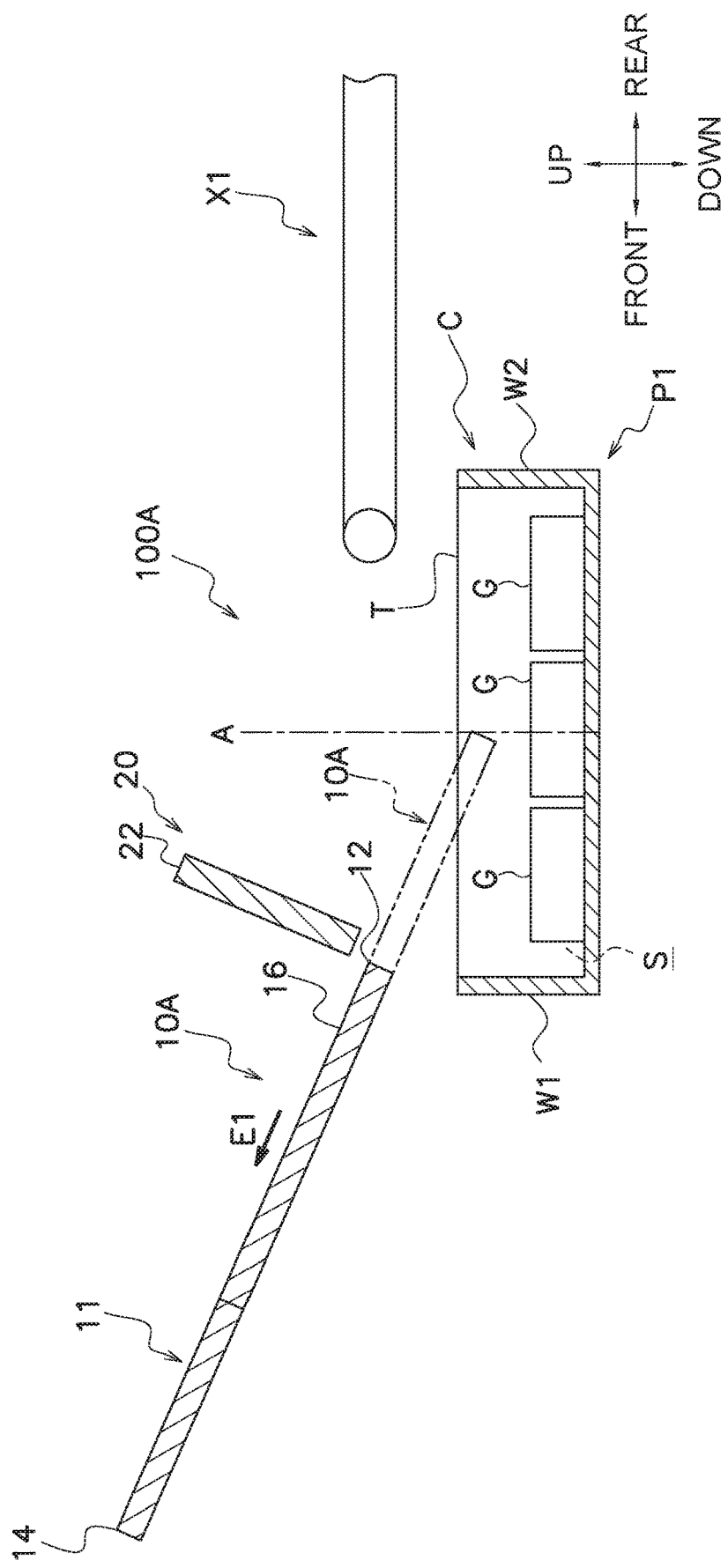
FIG. 6 is a side sectional view of an article transfer device of example modification 1A seen from the left side.

Furthermore, as in an article transfer device 100A shown in FIG. 6, after the posture changing mechanism 18a has changed the state of the first member 11 of a placement component 10A to the second state, the moving mechanism 18b may move the support members (not shown in the drawing) of the first member 11 of the placement component 10A parallelly along the placement surface 16 (see arrow E1 in FIG. 6). In other words, when the control unit 60 controls the operation of the placement component drive unit 18 so that the placement component 10A is pulled out from between the container C and the articles G, the moving mechanism 18b may parallelly move the first member 11 of the placement component 10A along the placement surface 16 as in FIG. 6. In the configuration illustrated in FIG. 6, the first member 11 moves while maintaining the second state (the state in which the angle of the placement surface 16 with respect to the horizontal plane is the angle α). Even in a case where the moving mechanism 18b is configured in this way, it is preferred that the moving mechanism 18b relatively move the first end 12 of the first member 11 at as low a height position as possible. For example, it is preferred that the moving mechanism 18b relatively move the first end 12 of the first member 11 in the containment space S at least to an intermediate position (a central position between the side wall W1 and the side wall W2; the position of long dashed short dashed line A in FIG. 6) in the first direction D1 of the container C as indicated by the long dashed double-short dashed line in FIG. 6. By configuring the moving mechanism 18b in this way, damage caused by the dropping of the articles G tends to be inhibited when the articles G move from the placement surface 16 of the first member 11 to the bottom surface B of the container C.

However, in the article transfer device 100A, compared to the article transfer device 100 of the above embodiment, the length of the device in the front and rear direction tends to become long due to the space in which the first member 11 moves.

(5-2) Example Modification 1B

In the above embodiment, in the article transfer device 100, after the posture changing mechanism 18a has changed the state of the first member 11 from the first state to the second state, the moving mechanism 18b relatively moves the first end 12 of the first member 11 in the first direction D1 along the bottom surface B of the container C.

Figure 7:
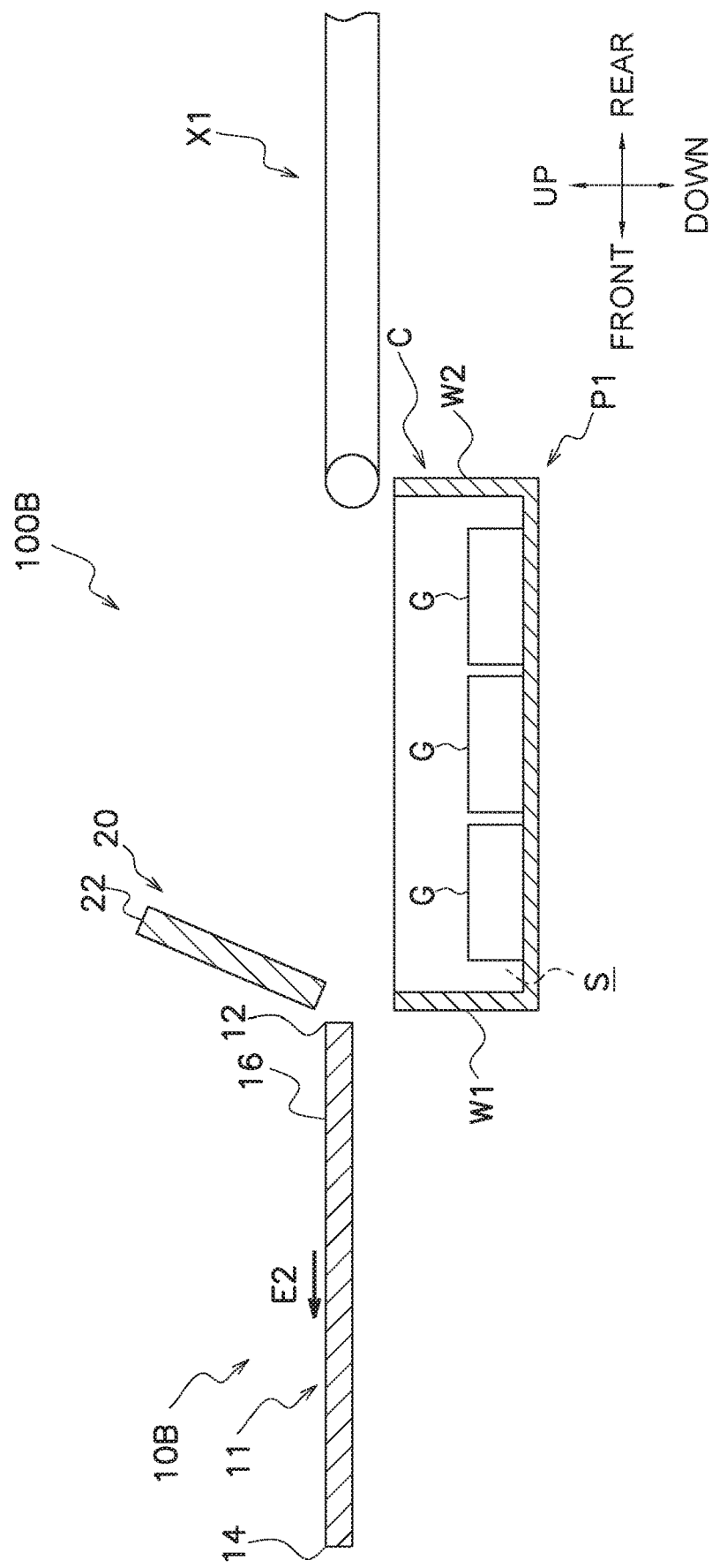
FIG. 7 is a side sectional view of an article transfer device of example modification 1B seen from the left side.

However, the configuration of the placement component drive unit 18 is not limited to the configuration in the above embodiment. For example, as in an article transfer device 100B shown in FIG. 7, the placement component drive unit 18 does not need to include the posture changing mechanism 18a. The moving mechanism 18b may parallelly move the first member 11 in the first state along an imaginary plane of the placement surface 16 of a placement component 10B (see arrow E2 in FIG. 7). In other words, when the control unit 60 controls the operation of the placement component drive unit 18 so that the placement component 10B is pulled out from between the container C disposed in the article transfer position P1 and the articles G, the moving mechanism 18b may horizontally move the first member 11 of the placement component 10B along the placement surface 16 as in FIG. 7. In the state illustrated in FIG. 7, the first member 11 moves while maintaining the first state. Movement of the articles G on the placement surface 16 of the first member 11 is inhibited by the pressing plate 22, so the articles G are transferred into the container C.

It will be noted that in the article transfer device 100B, compared to the article transfer device 100 of the above embodiment, the length of the device in the front and rear direction tends to become long due to the space in which the first member 11 moves.

(5-3) Example Modification 1C

In the above embodiment, the placement component 10 includes the single plate-shaped first member 11 and the first end 12 of the first member 11 relatively moves in the first direction D1 preferably from the neighborhood of the side wall W2 of the container C to the neighborhood of the side wall W1 of the container C. However, the placement component 10 is not limited to this kind of configuration and may have plural plate-shaped members.

For example, as in an article transfer device 100C of FIG. 8, a placement component 10C has a first member 11C1 and a second member 11C2 that are plate-shaped. The first member 11C1 and the second member 11C2 are members with the same size and shape. The first member 11C1 and the second member 11C2 are members that are quadrilateral in shape. The first member 11C1 is disposed on the right side, and the second member 11C2 is disposed on the left side.

The first member 11C1 has a first end 12C1, a second end 14C1, and a placement surface 16C1 that extends between the first end 12C1 and the second end 14C1. The first end 12C1 is an end portion of the first member 11C1 that is disposed on the left side and extends in the front and rear direction. The second end 14C1 is an end portion of the first member 11C1 that is disposed on the right side and extends in the front and rear direction.

The second member 11C2 has a first end 12C2, a second end 14C2, and a placement surface 16C2 that extends between the first end 12C2 and the second end 14C2. The first end 12C2 is an end portion of the second member 11C2 that is disposed on the right side and extends in the front and rear direction. The second end 14C2 is an end portion of the second member 11C2 that is disposed on the left side and extends in the front and rear direction.

The first end 12C2 of the second member 11C2 is an example of a third end. The second end 14C2 of the second member 11C2 is an example of a fourth end.

The first member 11C1 is disposed on a freely rotating roller 30C1 whose rotational axis coincides with the front and rear direction as in FIG. 8. Furthermore, the front and rear end portions in the neighborhood of the left-side end portion of the first member 11C1 are supported by support members not shown in the drawings. The second member 11C2 is placed on a freely rotating roller 30C2 whose rotational axis coincides with the front and rear direction as in FIG. 8. Furthermore, the front and rear end portions in the neighborhood of the right-side end portion of the second member 11C2 are supported by support members not shown in the drawings.

In the article transfer device 100C, the control unit 60, when transferring the articles G from the placement component 10C to the container C, controls the operation of the placement component drive unit 18 to change the angle formed by the placement surface 16C1 of the first member 11C1 and the bottom surface B of the container C so that the first end 12C1 of the first member 11C1 is disposed in a lower position than the second end 14C1 of the first member 11C1 and in the containment space S positioned lower than the top T of the side walls W1 to W4 of the container C (see the dashed line in FIG. 8). Furthermore, the control unit 60, when controlling the operation of the placement component drive unit 18 so that the placement component 10C is pulled out from between the container C and the articles G, relatively moves the first end 12C1 of the first member 11C1 in a first direction D1' (here, the rightward direction) in the containment space S to the neighborhood of the side wall W3 of the container C disposed on the downstream side in the first direction D1' (see the long dashed double-short dashed line in FIG. 8).

Furthermore, in the article transfer device 100C, the control unit 60, when transferring the articles G from the placement component 10C to the container C, controls the operation of the placement component drive unit 18 to change the angle formed by the placement surface 16C2 of the second member 11C2 and the bottom surface B of the container C so that the first end 12C2 of the second member 11C2 is disposed in a lower position than the second end 14C2 of the second member 11C2 and in the containment space S positioned lower than the top T of the side walls W1 to W4 of the container C (see the dashed line in FIG. 8). Furthermore, the control unit 60, when controlling the operation of the placement component drive unit 18 so that the placement component 10C is pulled out from between the container C and the articles G, relatively moves the first end 12C2 of the second member 11C2 in a second direction D2' in the containment space S to the neighborhood of the side wall W4 of the container C disposed on the downstream side in the second direction D2' (seethe long dashed double-short dashed line in FIG. 8). Here, the second direction D2' is the opposite direction of the first direction D1' and here is the leftward direction.

The operation of the first member 11C1 is the same as the operation of the first member 11 of the above embodiment except that the origin of the movement of the first end 12C1 of the first member 11C1 in the first direction D1' is the central portion of the container C in the right and left direction and that the first direction D1' is not the forward direction but the rightward direction. Furthermore, the operation of the second member 11C2 is the same as the operation of the first member 11C1 except that the operating direction is the opposite direction. For that reason, here, detailed description of the operation of the first member 11C1 and the second member 11C2 will be omitted.

(5-4) Example Modification 1D

In the above embodiment, the pusher 20 moves the pressing plate 22 in step S2 and thereafter does not move the pressing plate 22 any further. However, the pusher 20 is not limited to this and, when the moving mechanism 18b is moving the first member 11, may move the pressing plate 22 further toward the first end 12 side of the first member 11 so that the pressing plate 22 pushes the articles G.

(5-5) Example Modification 1E

In the above embodiment, the article transfer device 100 may have an immovable pressing plate 22 instead of the pusher 20. In other words, the article transfer device 100 does not need to have the pressing plate drive mechanism 24. In this case, the main function of the pressing plate 22 is to regulate forward movement of the articles G. It will be noted that in a case where the pressing plate 22 is immovable, a pressing plate 22' may be configured integrally with the first member 11 of the placement component 10 as in FIG. 9.

(5-6) Example Modification 1F

In the above embodiment, the first member 11 is a flat plate-shaped member, but it is not limited to this and may also be curved member.

(5-7) Example Modification 1G

In the above embodiment, the height position of the container C is moved in the up and down direction by the container moving mechanism 40, but the article transfer device is not limited to this. For example, the container C does not move in the up and down direction and the placement component 10 may move up and down instead.

Second Embodiment

An article transfer device 200 of a second embodiment of the invention will be described. The article transfer system including the article transfer device 200 is, except for the article transfer device 200, the same as that of the first embodiment, so description of an overview of the article transfer system will be omitted. Below, the details of the article transfer device 200 will be described.

(1) Detailed Configuration of Article Transfer Device

Figure 11:
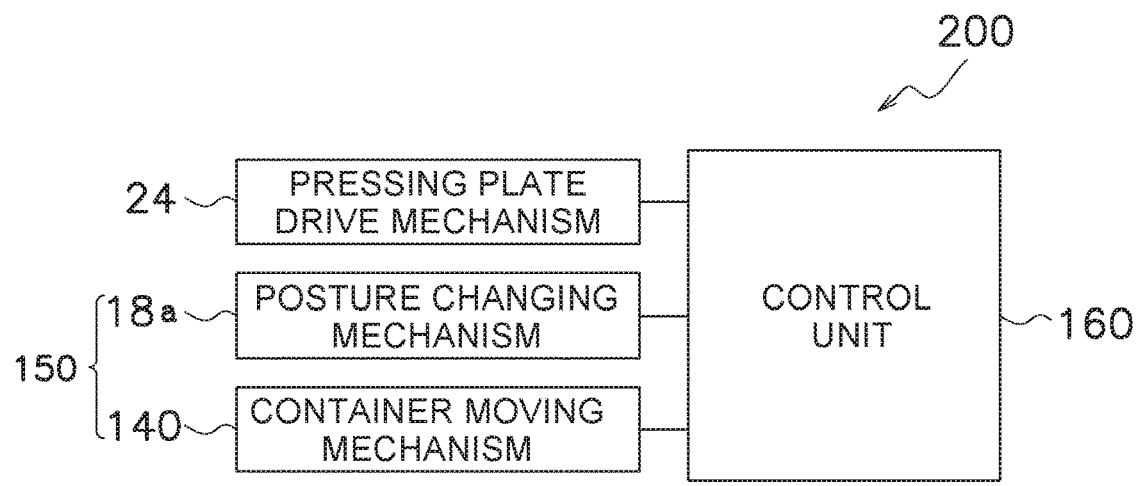
FIG. 11 is a control block diagram showing portions of the article transfer device of FIG. 10.

The detailed configuration of the article transfer device 200 will be described with reference to FIG. 10 and FIG. 11. FIG. 10 is a side sectional view of the article transfer device 200 seen from the left side. FIG. 11 is a control block diagram of the article transfer device 200.

It will be noted that the article transfer device 200 is in many respects the same as the article transfer device 100 of the first embodiment, so here mainly the differences between the article transfer device 200 and the article transfer device 100 will be described.

The article transfer device 200 has the placement component 10, a drive unit 150, the pusher 20, and a control unit 160.

The article transfer device 200 does not have the roller 30, and the first member 11 of the placement component 10 is supported by support members not shown in the drawings. The first member 11 of the placement component 10 is, except for its support structure, the same as that of the first embodiment, so here description thereof will be omitted.

The drive unit 150 is an example of a drive unit that relatively moves the container C and the placement component 10. The drive unit 150 includes the posture changing mechanism 18a and a container moving mechanism 140. The posture changing mechanism 18a is the same as that of the first embodiment. For that reason, here just the container moving mechanism 140 will be described. The container moving mechanism 40 of the first embodiment moves the container C only in the up and down direction. In contrast, the container moving mechanism 140 also moves the container C at least in the front and rear direction in addition to the up and down direction. The container moving mechanism 140 moves support members supporting the container C by means of a drive unit such as a motor in a way described later.

The pusher 20 is the same as the pusher 20 of the first embodiment, so here description thereof will be omitted.

The control unit 160 has the same physical configuration as that of the control unit 60 of the first embodiment. The control unit 160 mainly differs from the control unit 60 in that the control unit 160 controls the operation of the pressing plate drive mechanism 24 and the drive unit 150 including the posture changing mechanism 18a and the container moving mechanism 140, which are electrically connected to the control unit 160, as a result of a processor such as a CPU executing a program stored in a storage device.

(2) Operation of Article Transfer Device

The operation of the article transfer device 200 will be described with reference to FIG. 12A to FIG. 12D and FIG. 13 in addition to FIG. 10. FIG. 12A to FIG. 12D are drawings for describing the operation of the article transfer device 200 and show the operation of the article transfer device 200 in a time series. FIG. 12A to FIG. 12D are, like FIG. 10, side sectional views of the article transfer device 200 seen from the left side. FIG. 13 is a flowchart for describing the operation of the article transfer device 200.

Here, the operation of the article transfer device 200 will be described starting with a state in which the predetermined quantity of the articles G have been placed on the placement surface 16 of the placement component 10, the first member 11 is in the first state, and the container moving mechanism 140 has moved the container C under the placement component 10.

First, when transferring the articles G from the placement component 10 to the container C, the control unit 160 controls the operation of the drive unit 150 to change the posture of the placement component 10. In other words, when transferring the articles G from the placement component 10 to the container C, the control unit 160 controls the operation of the drive unit 150 to change the angle formed by the placement surface 16 of the placement component 10 and the bottom surface B of the container C to which the articles G are to be transferred (step S11). The control unit 160, by changing the angle formed by the placement surface 16 and the bottom surface B of the container C, disposes the first end 12 of the first member 11 in a lower position than the second end 14 of the first member 11 and in the containment space S positioned lower than the top T of the side walls W1 to W4 of the container C (see FIG. 12A). Specifically, the control unit 160 controls the operation of the posture changing mechanism 18a to change the state of the first member 11 from the first state in which the placement surface 16 is horizontal (see FIG. 10) to the second state in which the placement surface 16 is inclined by the angle α with respect to the horizontal plane (see FIG. 12A). It will be noted that when the posture changing mechanism 18a has changed the state of the first member 11 to the second state to change the angle formed by the placement surface 16 and the bottom surface B of the container C, the first end 12 of the first member 11 is disposed in the neighborhood of the lower end of the side wall W2 of the container C (see FIG. 12A). When the state of the first member 11 changes to the second state, the placement surface 16 of the first member 11 slopes downward toward the rear side (the first end 12 side).

Next, the control unit 160 controls the operation of the pusher 20 to move the pressing plate 22 of the pusher 20 along the placement surface 16 of the first member 11 of the placement component 10 from the side of the second end 14 of the first member 11 to the side of the first end 12 of the first member 11 (step S12). In other words, the control unit 160 moves the pressing plate 22 closer to the bottom surface B of the container C. The operation of the pusher 20 in this step is the same as that in step S2 of the first embodiment, so illustration thereof is omitted.

Next, the control unit 160 controls the operation of the drive unit 150 so that, when the articles G on the placement component 10 are above the container C, the placement component 10 is pulled out from between the container C and the articles G. Specifically, the control unit 160 controls the operation of the container moving mechanism 140 that moves the container C so that the first end 12 of the first member 11 relatively moves forward with respect to the container C and so that the placement component 10 is pulled out from between the container C and the articles G (step S13). Here, the first member 11 in the second state does not move, so the container moving mechanism 140 moves the container C rearward (e.g., in the direction of arrow F that points obliquely downward and rearward as in FIG. 12B). Preferably, the container moving mechanism 140 relatively moves the first end 12 of the first member 11 in the first direction D1 in the containment space S to the neighborhood of the side wall W1 of the container C disposed on the downstream side in the first direction D1 by moving the container C. Preferably, the container moving mechanism 140 relatively moves the first end 12 of the first member 11 in the first direction D1 to the neighborhood of the side wall W1 of the container C disposed on the downstream side in the first direction D1 so that the distance between the first end 12 and the bottom surface B of the container C becomes equal to or less than ½ the height of the side walls W1 to W4. In other words, it is preferred that the container moving mechanism 140 relatively move the first end 12 of the first member 11 with respect to the container C in generally the same way as in the first embodiment.

In the second embodiment, during the articles G are being transferred, the state of the first member 11 remains in the second state and does not change. Therefore, if the first member 11 is moved in the horizontal direction, there is a potential for the first member 11 to contact the side wall W1 of the container C. For that reason, it is preferred that the control unit 160 control the operation of the container moving mechanism 140 so that the first member 11 does not contact the side wall W1 of the container C.

Figure 12A:
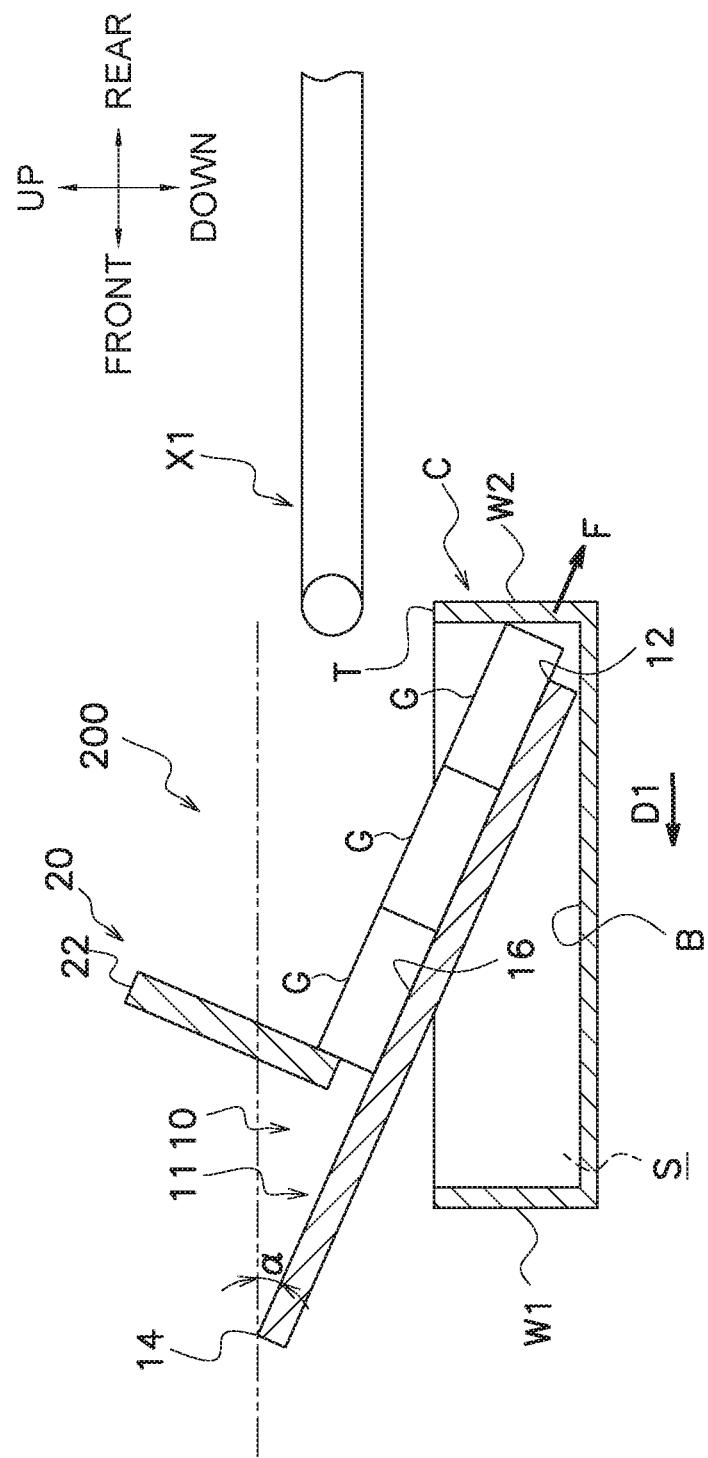
FIG. 12A is a schematic drawing showing a portion of the operation of the article transfer device of FIG. 10, and is a side sectional view of the article transfer device seen from the left side.
Figure 12D:
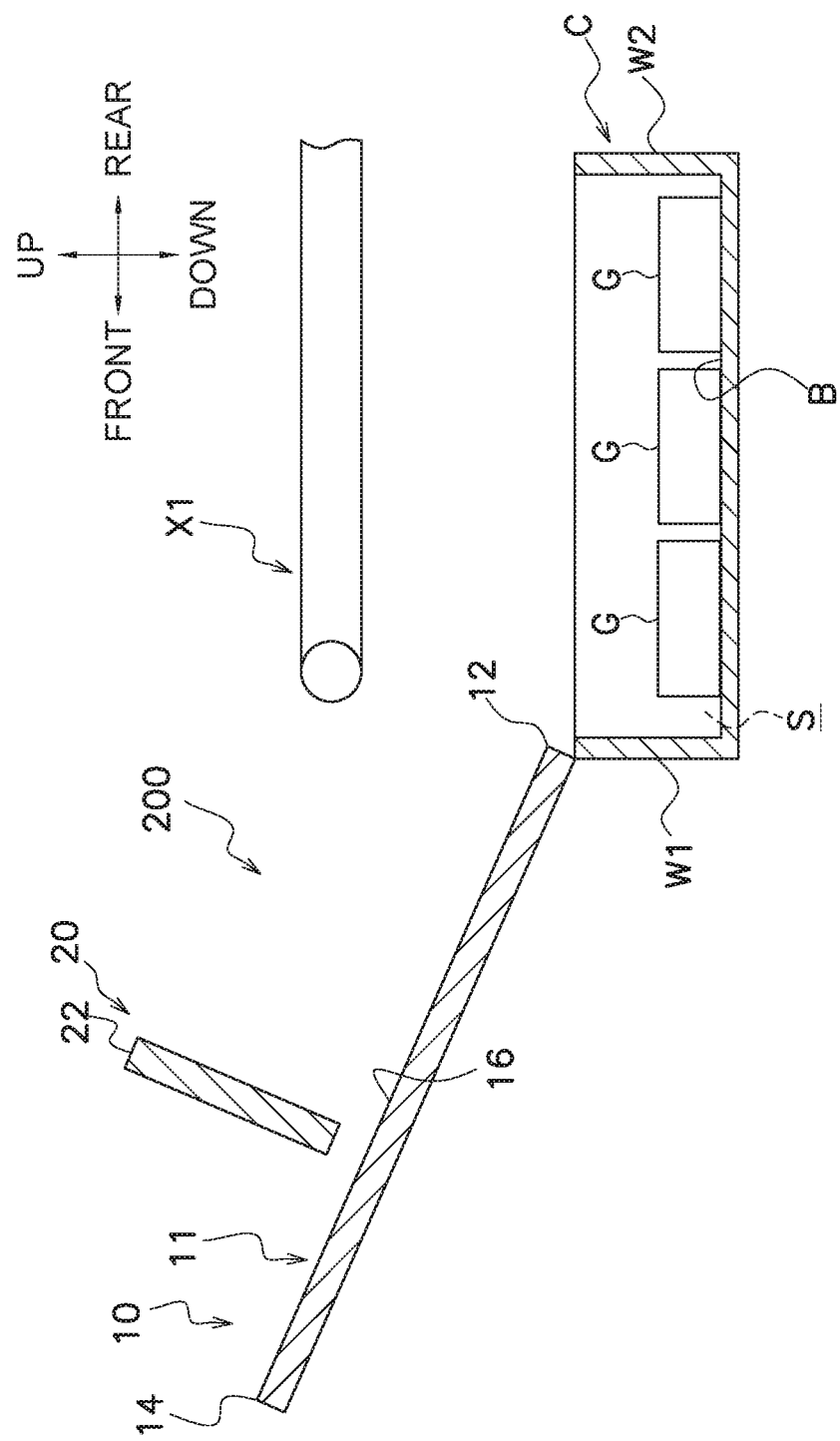
FIG. 12D is a schematic drawing showing a portion of the operation of the article transfer device of FIG. 10, and is a side sectional view of the article transfer device seen from the left side.
Figure 13:
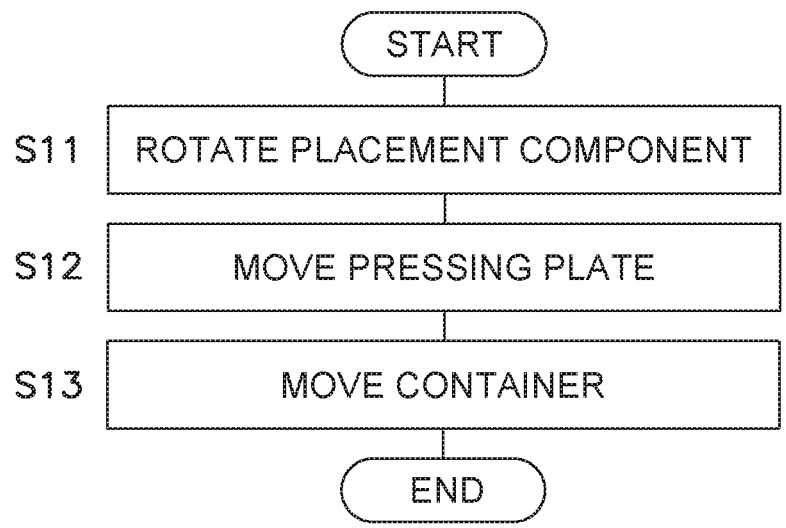
FIG. 13 is a flowchart showing basic steps of operation of the article transfer device of FIG. 10.

As a result of the container moving mechanism 140 moving the container C rearward, the articles G on the placement surface 16 of the first member 11 move by sliding on the placement surface 16 to the side of first end 12 and are transferred to the bottom surface B of the container C sequentially from the rear to forward (see FIG. 12C and FIG. 12D). The control unit 160 controls the operation of the container moving mechanism 140 to hand over, to the container outbound conveyance mechanism X3, the container C to which the articles G have been transferred. The container outbound conveyance device X3 conveys out the container C to which the articles G have been transferred, and which has been handed over from the article transfer device 200.

Figure 9:
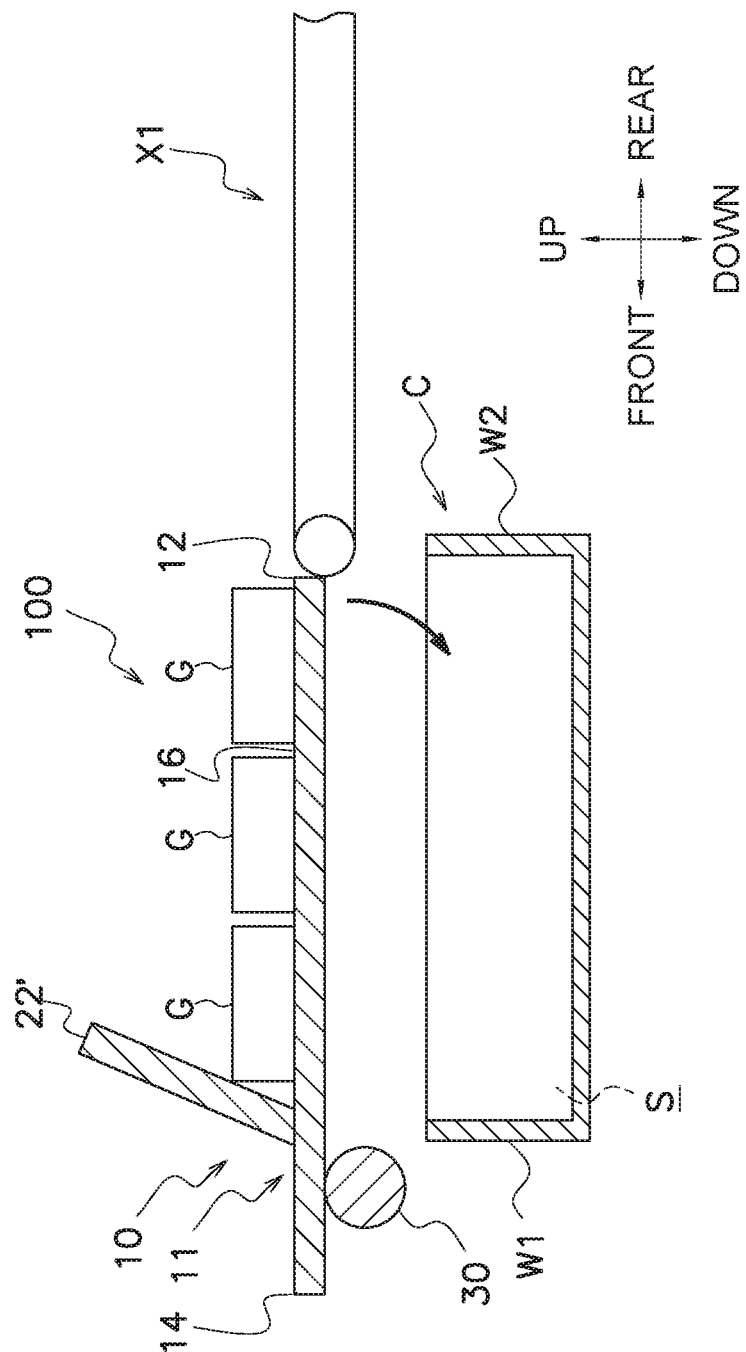
FIG. 9 is a side sectional view of an article transfer device of example modification 1E seen from the left side.

It will be noted that when the transfer of the articles G to the container C ends, the control unit 160 drives the drive unit 150 to return the first member 11 to the state illustrated in FIG. 9, and moves an empty container C the container supply device X2 supplies under the placement component 10.

(3) Characteristics of Article Transfer Device (3-1)

The article transfer device 200 of the present embodiment transfers, from the placement component 10 including the placement surface 16 on which the plural articles G are placed, the plural articles G to the container C. The article transfer device 200 includes the drive unit 150 and the control unit 160. The drive unit 150 relatively moves the container C and the placement component 10. The control unit 160 controls the operation of the drive unit 150. The control unit 160 controls the operation of the drive unit 150 so that, when the articles G on the placement component 10 are above the container C, the placement component 10 is pulled out from between the container C and the articles G.

In the article transfer device 200, the amount of time required to transfer the articles can be shortened compared to a case where the article transfer device grips the articles G on the placement component 10, moves them, and releases the articles G above the container C. Furthermore, in the article transfer device 200, the articles G do not need to be gripped to transfer them, so the occurrence of problems that can arise when the articles G are gripped can be eliminated.

(3-2)

In the article transfer device 200 of the present embodiment, when transferring the articles G from the placement component 10 to the container C, the control unit 160 controls the operation of the drive unit 150 to change the angle formed by the placement surface 16 of the placement component 10 and the bottom surface B of the container C.

In the article transfer device 200, by changing the angle of the placement surface 16 of the placement component 10 with respect to the bottom surface B of the container C, inclination can be utilized to transfer the articles G to the container C. Furthermore, by utilizing inclination to transfer the articles G to the container C, damage to the articles G can be inhibited compared to a case where the articles G are vertically dropped.

(3-3)

In the article transfer device 200 of the present embodiment, the placement component 10 includes the plate-shaped first member 11. The first member 11 has the first end 12, the second end 14, and the placement surface 16 that extends between the first end 12 and the second end 14. When transferring the articles G from the placement component 10 to the container C, the control unit 160 controls the operation of the drive unit 150 to change the angle formed by the placement surface 16 of the first member 11 and the bottom surface B of the container C so that the first end 12 of the first member 11 is disposed in a lower position than the second end 14 of the first member 11 and in the containment space S positioned lower than the top T of the side walls W1 to W4.

In the article transfer device 200, the first end 12 of the first member 11 of the placement component 10 at least temporarily enters the inside of the containment space S positioned lower than the top T of the side walls W1 to W4 of the container C. For that reason, in the article transfer device 200, the articles G can be moved from the first end 12 side of the first member 11 disposed in a relatively low position to the bottom surface B of the container C. Consequently, in the article transfer device 200, damage accompanying a vertical drop of the articles G to the bottom surface B of the container C tends to be inhibited.

(3-4)

In the article transfer device 200 of the present embodiment, when the control unit 160 controls the operation of the drive unit 150 so that the placement component 10 is pulled out from between the container C and the articles G, the first end 12 of the first member 11 relatively moves in the first direction D1 in the containment space S to the neighborhood of the side wall W1 of the container C disposed on the downstream side in the first direction D1.

In the article transfer device 200, the first end 12 of the first member 11 moves inside the containment space S positioned lower than the top T of the side walls W1 to W4 of the container C, so the articles G can be moved from the first end 12 side of the first member 11 disposed in a relatively low position to the container C. Consequently, in the article transfer device 200, damage accompanying a vertical drop of the articles G to the bottom surface B of the container C tends to be inhibited.

(3-5)

In the article transfer device 200 of the present embodiment, when the control unit 160 controls the operation of the drive unit 150 so that the placement component 10 is pulled out from between the container C and the articles G, the first end 12 of the first member 11 relatively moves from the neighborhood of the side wall W2 of the container C disposed on the upstream side in the first direction D1 to the neighborhood of the side wall W1 of the container C disposed on the downstream side in the first direction D1.

In the article transfer device 200, the first end 12 of the first member 11 relatively moves in the containment space S from the neighborhood of the side wall W2 of the container C disposed on the upstream side in the first direction D1 to the neighborhood of the side wall W1 of the container C disposed on the downstream side in the first direction D. For that reason, in the article transfer device 200, damage accompanying a vertical drop to the bottom surface B of the container C can be inhibited in regard to almost all the articles G transferred to the container C.

(3-6)

The article transfer device 200 of the present embodiment has the pusher 20. The pusher 20 moves along the placement surface 16 of the first member 11 of the placement component 10 from the second end 14 side of the first member 11 to the first end 12 side of the first member 11. Specifically, the pressing plate 22 of the pusher 20 moves along the placement surface 16 of the first member 11 of the placement component 10 from the second end 14 side of the first member 11 to the first end 12 side of the first member 11.

In the article transfer device 200, the articles G can be smoothly moved along the placement surface 16 of the first member 11 downward to the container C.

(4) Example Modifications

Example modifications of the second embodiment will be described below. It will be noted that some or all of the content of each example modification may be combined with the content of the second embodiment or the content of another example modification to the extent that they are not mutually incompatible. Furthermore, some or all of the content of each example modification may also be combined with the content of the first embodiment or the content of the example modifications of the first embodiment to the extent that they are not mutually incompatible. Moreover, some or all of the content of the first embodiment and the content of the example modifications of the first embodiment may also be combined with the content of the following example modifications to the extent that they are not mutually incompatible.

(4-1) Example Modification 2A

In the above embodiment, the posture changing mechanism 18a moves the first end 12 of the first member 11 lower than the first end 14 of the first member 11, but the posture changing mechanism 18a is not limited to this. For example, as in an article transfer device 200A shown in FIG. 14, the posture changing mechanism 18a may move the second end 14 of the first member 11 lower than the first end 12 of the first member 11. In this article transfer device 200A, the container moving mechanism 140 of the drive unit 150 moves the container C forward.

It will be noted that, in the article transfer device 200A, the first member 11 may also be inclined from the start (from the point in time when the article conveyance device X1 supplies the articles G) with respect to the horizontal plane as shown in FIG. 14. In a case where the first member 11 is inclined from the start with respect to the horizontal plane, the article transfer device 200A does not need to have the posture changing mechanism 18a.

(4-2) Example Modification B

The control unit 160, when using the container moving mechanism 140 to move the container C to transfer the articles G, may further control the operation of the posture changing mechanism 18a to change the posture (inclination) of the first member so that the first member 11 does not contact the side wall W1 of the container C. Additionally, the control unit 160 may also control the operation of the posture changing mechanism 18a and the container moving mechanism 140 so that the first end 12 of the first member 11 relatively moves forward in the containment space S along the bottom surface B of the container C to the neighborhood of the side wall W1 of the container C disposed in front of it.

INDUSTRIAL APPLICABILITY

The present invention can be widely applied to article transfer devices that transfer plural article from a placement component to a container and is therefore useful.

REFERENCE SIGNS LIST 10, 10A, 10B, 10C Placement Component
11, 11C1 First Member
11C2 Second Member
12, 12C1 First End (First End of First Member)
14, 14C1 Second End (Second End of First Member)
12C2 First End (Third End of Second Member)
14C2 Second End (Fourth End of Second Member)
16, 16C1, 16C2 Placement Surface
18 Placement Component Drive Unit (Drive Unit)
20 Pusher
60 Control Unit
100, 100A, 100B, 100C Article Transfer Device
150 Drive Unit
160 Control Unit
200.200A Article Transfer Device
B Bottom Surface of Container
C Container
D1 First Direction
D1' First Direction
D2' Second Direction
G Article
S Containment Space
T Top of Side Walls of Containers
W1 Side Wall (Side Wall Disposed on Downstream Side in First Direction)
W2 Side Wall (Side Wall Disposed on Upstream Side in First Direction)
W3 Side Wall (Side Wall Disposed on Downstream Side in First Direction)
W4 Side Wall (Side Wall Disposed on Downstream Side in Second Direction)

CITATION LIST

Patent Literature

Patent Document 1: JP-A No. 2011-251702

What is claimed is:

1. An article transfer device that transfers a plurality of articles from a placement component to a container, the placement component having a placement surface on which plural articles are placed and then moved directly into a container, the article transfer device comprising:
   a drive unit configured to relatively move the container and the placement component; and
   a control unit configured to control the operation of the drive unit,
   the control unit is configured to control the operation of the drive unit so that, when the articles on the placement component are above the container, the placement component is pulled out from between the container and the articles, the placement component further having a plate-shaped first member that has a first end and a second end, with the placement surface extending between the first end and the second end, the container including a bottom wall and side walls that are disposed surrounding the bottom surface forming in the container a containment space that is dimensioned to contain the articles, and
   the control unit being configured to control the operation of the drive unit to change an angle defined between the placement surface of the first member and the bottom surface of the container when transferring the articles from the placement component to the container so that the first end of the first member is disposed in a lower position than the second end of the first member and in the containment space positioned lower than a top of the side walls.

2. The article transfer device according to claim 1, wherein the control unit is configured to relatively move the first end of the first member relatively in a first direction in the containment space to proximate the side wall of the container a downstream side in the first direction when the control unit controls the operation of the drive unit so that the placement component is pulled out from between the container and the articles.

3. The article transfer device according to claim 2, wherein the control unit is configured to move the first end of the first member relatively along the bottom surface of the container to the neighborhood of the side wall of the container disposed on the downstream side in the first direction when the control unit controls the operation of the drive unit so that the placement component is pulled out from between the container and the articles.

4. The article transfer device according to claim 2, wherein the control unit is configured such that when controlling the operation of the drive unit so that the placement component is pulled out from between the container and the articles, the first end of the first member relatively moves from proximate the side wall of the container on an upstream side in the first direction to proximate the side wall of the container disposed on the downstream side in the first direction.

5. The article transfer device according to claim 2, wherein
   the placement component further includes a plate-shaped second member that has a third end, a fourth end, and the placement surface that extends between the third end and the fourth end,
   the control unit is configured to control the operation of the drive unit to change the angle defined between the placement surface of the second member and the bottom surface of the container so that the third end of the second member is disposed in a lower position than the fourth end of the second member and in the containment space positioned lower than the top of the side walls when transferring the article from the placement component to the container, and
   the control unit is configured such that when controlling the operation of the drive unit so that the placement component is pulled out from between the container and the articles, the third end of the second member relatively moves in a second direction opposite to the first direction in the containment space to a neighborhood of the side wall of the container disposed on a downstream side in the second direction.

6. An article transfer device that transfers a plurality of articles from a placement component to a container, the placement component including a placement surface on which plural articles are placed and then moved directly into a container, the article transfer device comprising:
   a drive unit configured to relatively move the container and the placement component and
   a control unit configured to control the operation of the drive unit so that when the articles on the placement component are above the container, the placement component is pulled out from between the container and the articles, and
   the control unit further controls the operation of the drive unit so that the placement component is pulled out from between the container and the articles, the drive unit parallelly moves the placement component along the placement surface.

7. The article transfer device according to claim 1, further comprising a pusher that moves along the placement surface of the first member from the second end side to the first end side.

8. The article transfer device according to claim 3, wherein the control unit is configured such that when controlling the operation of the drive unit so that the placement component is pulled out from between the container and the articles, the first end of the first member relatively moves from proximate the side wall of the container disposed on an upstream side in the first direction to proximate the side wall of the container disposed on the downstream side in the first direction.

9. The article transfer device according to claim 3, wherein
   the placement component further includes a plate-shaped second member that has a third end, a fourth end, and the placement surface that extends between the third end and the fourth end,
   the control unit being configured such that when transferring the article from the placement component to the container, the control unit controls the operation of the drive unit to change the angle formed by the placement surface of the second member and the bottom surface of the container so that the third end of the second member is disposed in a lower position than the fourth end of the second member and in the containment space positioned lower than the top of the side walls, and
   the control unit is further configured such that when controlling the operation of the drive unit so that the placement component is pulled out from between the container and the articles, the third end of the second member relatively moves in a second direction opposite to the first direction in the containment space to proximate the side wall of the container disposed on a downstream side in the second direction.

10. An article transfer device that transfers a plurality of articles from a placement component to a container, the placement component including a placement surface on which plural articles are placed and then moved directly into a container, the article transfer device comprising:
- a drive unit configured to relatively move the container and the placement component; and
- a control unit configured to control the operation of the so that when the articles on the placement component are above the container, the placement component is pulled out from between the container and the articles,
- the control unit is also configured to control the operation of the drive unit to change an angle defined between the placement surface of the placement component and a bottom surface of the container when transferring the articles from the placement component to the container, and
- the control unit is configured such that when controlling the operation of the drive unit so that the placement component is pulled out from between the container and the articles, the drive unit parallelly moves the placement component along the placement surface.

11. The article transfer device according to claim 2, further comprising a pusher that moves along the placement surface of the first member from the second end side to the first end side.

* * * * *